(12) United States Patent  (10) Patent No.: US 6,992,826 B2
Wang  (45) Date of Patent: Jan. 31, 2006

(54) DEVICES BASED ON AN ARRAY OF LIGHT-FILTERING CHANNELS WITH SURFACE PLASMON INTERFERENCE FILTERS

(75) Inventor: Yu Wang, La Crescenta, CA (US)

(73) Assignee: California Institute of Technology, Pasadena, CA (US)

( * ) Notice: Subject to any disclaimer, the term of this patent is extended or adjusted under 35 U.S.C. 154(b) by 729 days.

(21) Appl. No.: 09/965,033

(22) Filed: Sep. 25, 2001

(65) Prior Publication Data

US 2002/0036828 A1 Mar. 28, 2002

Related U.S. Application Data

(60) Division of application No. 09/144,519, filed on Aug. 31, 1998, now Pat. No. 6,297,907, which is a continuation-in-part of application No. 08/949,151, filed on Oct. 10, 1997, now Pat. No. 5,986,808.

(60) Provisional application No. 60/060,733, filed on Oct. 1, 1997, provisional application No. 60/059,247, filed on Sep. 18, 1997, and provisional application No. 60/056,050, filed on Sep. 2, 1997.

(51) Int. Cl.
*G02B 1/10* (2006.01)

(52) U.S. Cl. .................. 359/585; 359/578; 359/589; 359/584; 349/105; 349/106; 345/88; 348/744

(58) Field of Classification Search .......... 359/577–580, 359/584–585, 582, 589; 349/105–106; 345/88; 348/744

See application file for complete search history.

(56) References Cited

U.S. PATENT DOCUMENTS 5,451,980 A * 9/1995 Simon et al. ................. 345/88
5,570,139 A   10/1996 Wang \* cited by examiner

*Primary Examiner*—Leonidas Boutsikaris
(74) *Attorney, Agent, or Firm*—Fish & Richardson P.C.

(57) ABSTRACT

Devices based on surface plasmon filters having at least one metal-dielectric interface to support surface plasmon waves. A multi-layer-coupled surface plasmon notch filter is provided to have more than two symmetric metal-dielectric interfaces coupled with one another to produce a transmission spectral window with desired spectral profile and bandwidth. Such notch filters can form various color filtering devices for color flat panel displays.

12 Claims, 17 Drawing Sheets

DEVICES BASED ON AN ARRAY OF LIGHT-FILTERING CHANNELS WITH SURFACE PLASMON INTERFERENCE FILTERS

This application is a divisional of U.S. patent application Ser. No. 09/144,519 filed Aug. 31, 1998, now U.S. Pat. No. 6,297,907, which is a continuation-in-part of U.S. patent application Ser. No. 08/949,151, filed Oct. 10, 1997, now U.S. Pat. No. 5,986,808, which claims the benefit of U.S. provisional application Ser. Nos. 60/056,050, filed Sep. 2, 1997; 60/059,247, filed Sep. 18, 1997; and 60/060,733, filed Oct. 1, 1997.

ORIGIN OF THE INVENTION

The invention described herein was made in the performance of work under a NASA contract, and is subject to the provisions of Public Law 96-517 (35 U.S.C. 202) in which the Contractor has elected to retain title.

FIELD OF THE INVENTION present invention relates to wavelength tunable optical filters, and more particularly, to devices based on a surface plasmon tunable filter.

BACKGROUND

An optical wavelength filter is a device that reflects or transmits light of a desired wavelength or within a certain wavelength range. For example, an interference bandpass filter selectively transmits light within a selected wavelength transmission bandwidth while absorbing light of wavelengths outside the transmission bandwidth. Such optical filtering with respect to wavelength provides a means of controlling the energy and spectral composition of light and is widely used in a variety of optical signal processing, detection, and display applications.

Excitation of surface plasmon waves at a metal-dielectric interface has been demonstrated as an efficient way of implementing a spectral filtering mechanism in response to an electrical control signal. See, for example, Wang and Simon, "Electronic Reflection with Surface Plasmon," Opt. Quantum Electron.25, S925 (1993) and Wang, "Voltage-Induced Color-Selective Absorption with Surface Plasmon", Appl. Phys. Lett. 67, pp. 2759–2761 (1995). Surface plasmon are oscillations of free electrons caused by resonant absorption of a p-polarized incident optical wave at a metal-dielectric interface when the wavelength and incident angle of the optical wave satisfy a plasmon resonance condition. More specifically, the plasmon resonance condition requires that the component of the optical wave vector along the metal-dielectric interface matches the plasmon wave vector, $K_p$:

$$K_p = \frac{2\pi}{\lambda}\sqrt{\frac{\varepsilon_1\varepsilon_2}{\varepsilon_1+\varepsilon_2}},$$

where, $\lambda$ is the wavelength of the optical wave, $\varepsilon_1$ and $\varepsilon_2$ are the dielectric permittivity constants for the metal and the dielectric material, respectively.

At surface plasmon resonance, the energy of the incident optical wave is strongly absorbed and converted into the energy of oscillating free electrons in the metal. Therefore, the reflected optical wave is strongly attenuated or even vanishes. When the incident angle of the optical wave is fixed at a constant, the optical wavelength $\lambda$ satisfying the plasmon resonance condition may be changed by varying the dielectric permittivity constant $\varepsilon_2$ of the dielectric material. If the input optical wave is white light, the color of the reflected optical wave will change with $\varepsilon_2$. This phenomena effects a surface plasmon tunable filter in reflection mode.

Therefore, an electronically tunable filter can be formed by using an electro-optic material as the dielectric material. The voltage applied on the electro-optic material changes its index of refraction and thereby changes the wavelength for the surface plasmon resonance.

Wang and Simon disclose color display devices based on a surface plasmon filter using a liquid crystal electro-optic material. U.S. Pat. Nos. 5,451,980 and 5,570,139, which are incorporated herein by reference. The index of the refraction of the liquid crystal is changed by applying a voltage to alter the spectral composition of the reflected light.

SUMMARY

The devices disclosed herein use surface plasmon waves at metal-dielectric interfaces to alter the spectral composition of light having a p-polarized component. The metal material in general has a negative dielectric constant and the dielectric material has a positive dielectric constant. The electrical field of the p-polarized component at non-normal incidence induces electric dipoles in a metallic layer that forms one side of a metal-dielectric interface due to the excitation of the free electrons in the metal. The direction of the induced dipoles is perpendicular to the metal-dielectric interface. The radiation of the dipoles generates a surface plasmon wave with a wave vector parallel to the interface. The strength of the surface plasmon wave is maximal at the metal-dielectric interface and decays exponentially on both sides of the interface.

The energy conversion from the incident light to the surface plasmon wave is maximal when the incident angle, wavelength of the incident light, the dielectric constants of the metal and the dielectric materials satisfy a surface plasmon resonance condition. In general, this resonance condition relates to mode matching between the p-polarized incident light and the surface plasmon wave at a metal-dielectric interface and may vary with the specific incident coupling mechanism and the structure of the interfaces (e.g., a single interface or two closed coupled interfaces)

One embodiment of a surface plasmon filter includes a dielectric layer sandwiched between two metallic layers to form two closely spaced symmetrical metal-dielectric interfaces. The optical thickness of the dielectric layer is configured to allow for excitation of surface plasmon waves on both metal-dielectric interfaces by an input optical wave. The dielectric layer may be less or larger than one wavelength but in general on the order of a wavelength. The coupling between the surface plasmon waves produces a reflected wave and a transmitted wave that have mutually complimentary colors.

The surface plasmon resonance frequency can be tuned by adjusting the optical thickness of the dielectric layer. Either the layer thickness or the index of the refraction of the dielectric layer may be adjusted to change the transmission wavelength. One implementation uses an adjustable air gap as the dielectric layer. Another implementation uses a layer of an electro-optic material to vary the optical thickness by changing the index of refraction with a voltage control signal.

One or more additional metal-dielectric interfaces may be added and coupled to the two metal-dielectric interfaces to form a multilayer surface plasmon filter. Such a multilayer structure can be configured to achieve a desired shape in the transmission spectrum profile. For example, a "notch" filter can be so formed to produce a square-like transition from a transmissive spectral region to a reflective spectral region and to achieve a desired transmissive bandwidth.

The surface plasmon filter can be used to form a wide range of devices. One such device is a tunable Fabry-Perot filter based on an air-gap surface plasmon filter. Various color filters for color display systems such as color LCD displays can be formed based on a surface plasmon filter.

These and other aspects and advantages of the present invention will become more apparent in light of the accompanying drawings, the detailed description, and the claims.

DETAILED DESCRIPTION OF THE PREFERRED EMBODIMENTS

Figure 1:
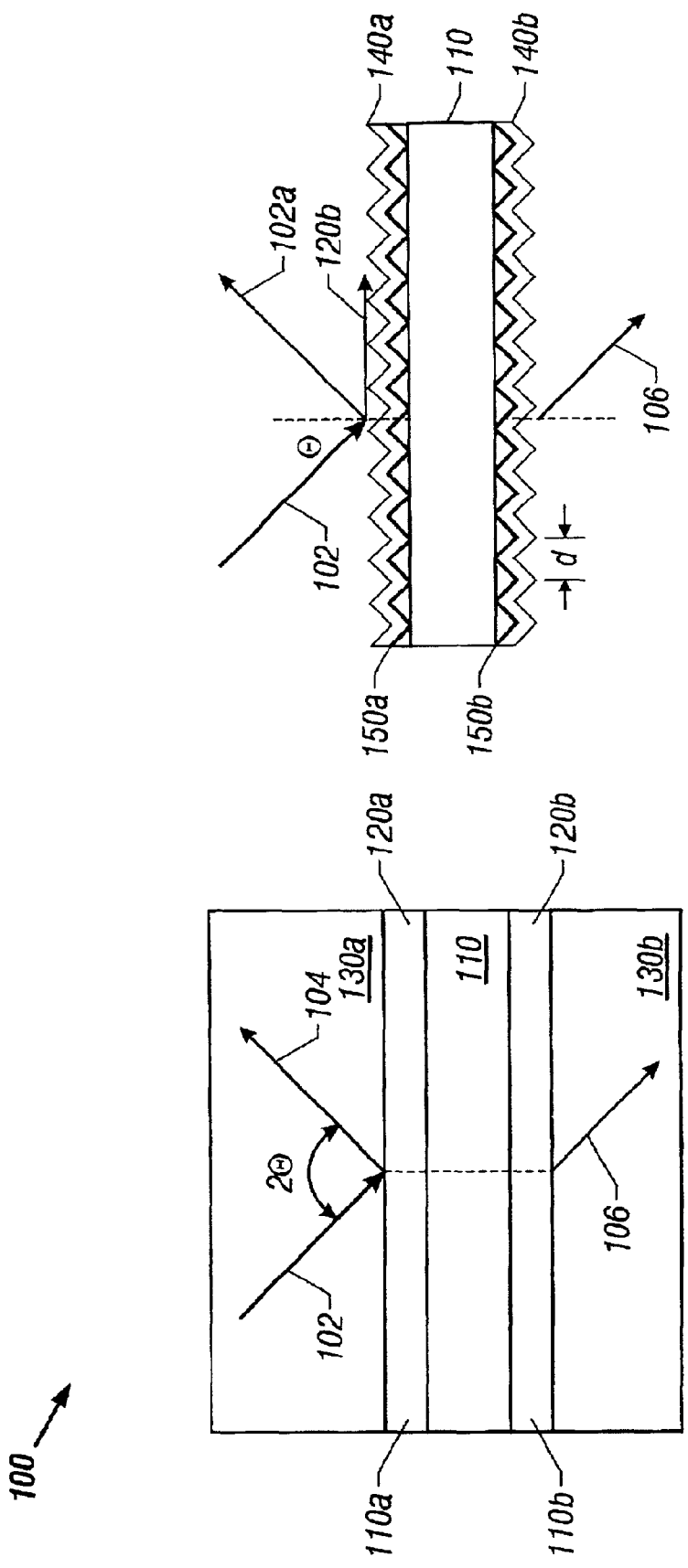
FIG. 1A is a diagram showing one embodiment of the surface plasmon filter using a high-index material for light coupling.
FIG. 1B is a diagram showing another embodiment of the surface plasmon filter using a grating for light coupling.

FIG. 1A shows one embodiment 100 of a coupled surface plasmon tunable filter. Two symmetrical metal-dielectric interfaces 110a and 110b are formed by sandwiching a dielectric layer 110 between two substantially identical metallic layers 120a and 120b. The metallic layers 120a and 120b are sufficiently thin so that the evanescent electromagnetic waves can penetrate the metallic layers 120a and 120b. The evanescent waves may be generated by, for example, an incident optical wave or coupling of oscillating electrical fields caused by surface plasmon waves. In general, the thickness of the metallic layers 120a and 120b may be any value. However, the preferred thickness is from about 5 nm to about 150 nm and most preferably from about 10 nm to about 100 nm. A variety of metals may be used for forming the layers 120a and 120b, including but not limited to, Ag, Al, Au, K, and Li.

The dielectric layer 110 may be any dielectric material, including air or an electro-optic material including inorganic crystals (e.g., KDP, KTP, LiNbO$_4$), polymide guest-host materials, organic crystals (e.g., MMONS and MNA), organic salts, and liquid crystals. The thickness of the dielectric layer 110 is sufficiently thin to allow for efficient energy coupling between the first metallic-dielectric interface 110a and the second metallic-dielectric interface 110b. Preferably, the optical thickness of the dielectric layer 110 is on the order of a wavelength.

An incident optical wave 102 to the metallic layer 120a can excite a surface plasmon wave at the first interface 110a if the surface plasmon resonance condition is met. The energy of photons in the surface plasmon resonance is converted into collective oscillations of free electrons generated in the first metallic layer 120a. This causes strong absorption of the photons at the resonant wavelength in the incident optical wave 102 and the unabsorbed photons are reflected as the reflected wave 104 from the first metallic layer 120a.

The oscillating free electrons in the first metallic layer 120*a* generate an evanescent optical wave at the wavelength of the absorbed resonant photons. The field of the evanescent optical wave penetrates the thin dielectric layer 110 to reach the second metallic-dielectric interface 110*b*. The field of the evanescent optical wave can excite a second surface plasmon wave on the second interface 110*b*. This is at least in part due to the symmetry of the two interfaces 110*a* and 110*b* with respect to the dielectric layer 110. The second surface plasmon wave is substantially identical to the first surface plasmon wave including the frequency and the plasmon wave vector. The oscillating free electrons in the second metallic layer 120*b* radiate photons in the same direction and at the same frequency as the absorbed resonant photons at the first metallic layer 120*a*. The radiated photons exit the second metallic layer 120*b* as a transmitted wave 106 which is substantially parallel to the input beam 102.

Therefore, for an incident light with a broad spectrum, the device 100 of FIG. 1 will couple the spectral component that satisfies the surface plasmon resonance condition to the second interface 110*b* as the transmitted wave 106 and reflects the rest of the input light as the reflected wave 104. In particular, a white input beam may be split into a colored transmitted beam and a reflected beam which is spectrally complimentary to the transmitted beam.

The excitation of the first surface plasmon wave at the first interface 110*a* and the excitation of the second plasmon wave at the second interface 110*b* are correlated. Under a surface plasmon resonance condition, the evanescent field pattern of the first surface plasmon wave in the dielectric layer 110 and the evanescent field pattern of the second surface plasmon wave affect each other to match the field patterns. The incident angle and wavelength of the incident optical wave 102 and the optical thickness of the dielectric layer 110 can be adjusted to satisfy the resonance condition in order to achieve simultaneous excitation of both the first and the second plasmon waves. The exact resonance condition can be determined by applying the Maxwell wave equations to each of the dielectric layer 110 and the two metallic layers 120*a* and 120*b* and by matching the boundary conditions at interfaces 110*a* and 110*b*.

For a given incident angle of the input optical wave 102, the optical thickness of the dielectric layer 110 may be adjusted to achieve excitation of the surface plasmon waves at different wavelengths to effect color filtering in both transmitted beam 108 and the reflected beam 104. The optical thickness of the dielectric layer 110 is the product of its index of refraction and the layer thickness. Therefore, the layer thickness of the dielectric layer 110, or the index of refraction, or both may be varied in order to select different wavelengths to meet the resonance condition of surface plasmon waves at the interfaces 110*a* and 110*b*.

Referring to FIG. 1, the embodiment 100 further includes two identical dielectric layers 130*a* and 130*b* respectively formed on the metallic layers 120*a* and 120*b*. The index of the refraction of the layers 130*a* and 130*b* is larger than that of the dielectric layer 110 in order to properly couple the input optical beam 102 to excite surface plasmon waves. For example, a high-index prism (e.g., $TiO_2$) may be used to couple the input optical wave 102 at a specified incident angle. In general, the incident angle of the input optical wave 102 is larger than the critical angle for total reflection defined by the high-index layer 130*a* (or 130*b*) and the dielectric layer 110.

The coupling dielectric layers 130*a* and 130*b* are usually in form of prisms and may be made of any dielectric material with an index of refraction higher than that of the dielectric layer 110. Examples of suitable high-index materials include glasses such as SF glass (e.g., SF6, SF57, SF58, SF59, etc.) and LaSF glass (e.g., LaSFN18, LaSFN31, LasFN9, LaSF13, etc.), crystals such as $TiO_2$, sapphire, diamond, and high-index polymers.

Alternatively, a grating may also be used for light coupling as shown in FIG. 1B. In this embodiment, two substantially identical gratings 140*a* and 140*b* substitute the high-index coupling dielectric layers (130*a* and 130*b*). Each of the gratings 140*a* and 140*b* is coated with a layer of metal film ( 150*a* and 150*b*) to form the metal-dielectric interfaces. The gratings 140*a* and 140*b* are configured to produce a diffracted order 102*b* of the incident light 102 to have a wave vector parallel to the metal-dielectric interfaces. For example, the first-order diffraction beam may be used as the beam 102*b* to excite a surface plasmon wave and the zero-order diffraction beam is reflected as the beam 102*a*. Similar to the embodiment 100 of FIG. 1A, the coupling between the two symmetric interfaces produces the transmitted beam 106.

In the case where a surface plasmon wave is excited at only one metal-dielectric interface, the resonance condition requires $$\frac{2\pi}{\lambda}\sin\Theta \pm \frac{2\pi}{d} \cdot p = K_p,$$

where d is the grating period, p is an integer indicating the order of diffraction and $K_p$ is the surface plasmon wave vector defined by Equation (1). For the coupled symmetric structure shown in FIG. 1B, the surface plasmon resonance condition is more complex than Equation (2) and can be similarly determined as in the embodiment 100 of FIG. 1A by applying the Maxwell wave equations to each of the dielectric layer 110 and the two metallic layers 150*a* and 150*b* and by matching the boundary conditions at the interfaces.

The gratings 140*a* and 140*b* may be implemented in a number of ways. For example, one way is to attach a separately-formed grating to the dielectric layer 110; another way is to directly form a coupling grating on the dielectric layer 110; yet another way is to etch a grating on the surface of the dielectric layer. The gratings 140*a* and 140*b* in first two examples are preferably made of a transparent material in the operating spectral range. A dielectric material may be used to form a support for the grating coupled filter of FIG. 1B.

Figure 2:
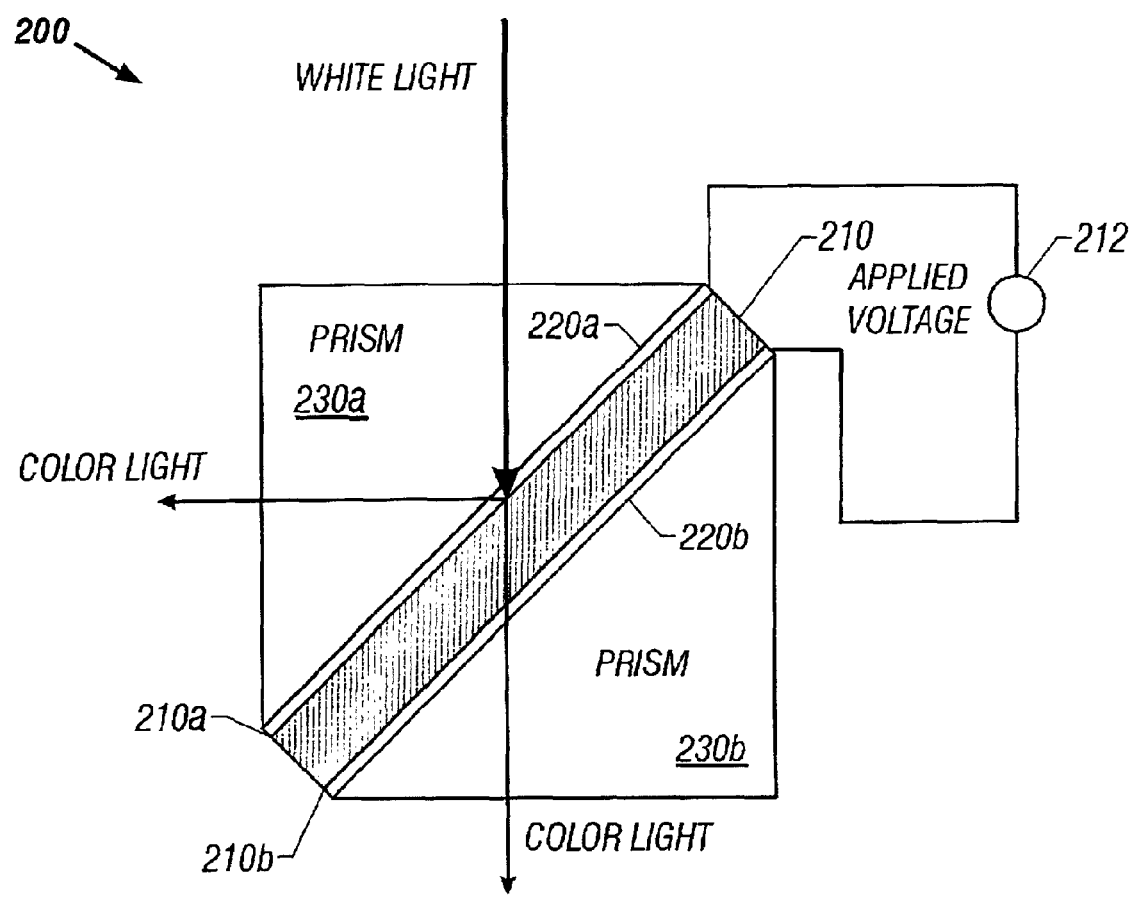
FIG. 2 is diagram showing a surface plasmon filter using a layer of electro-optic material and high-index prisms.

One implementation of the embodiment 100 is shown in FIG. 2. A thin layer of electro-optic material 210 with a fixed thickness less than a wavelength is sandwiched between two thin metallic films 220*a* and 220*b*. A first prism 230*a* is used as an input light coupling element by placing the hypotenuse in contact with the first thin metallic film 220*a*. Symmetrically, a second prism 230*b* identical to the 230*a* is disposed on the second metallic film 220*b* as an output light coupling element. The index of refraction of the prisms 230*a* and 230*b* is larger than that of the electro-optic material 210. An electrical voltage supply 212 is connected to the electro-optic material 210 to provide an electrical control of its index of refraction.

The electro-optic material 210 may be any suitable electro-optic material including KDP, KTP, $LiNbO_4$ crystals or a liquid crystal material. The thin metallic films 220*a* and 220*b* may be made of silver, aluminum, or other metals with desired dispersion properties in the surface plasmon excitation. In the visible spectral range, metals such as Ag or Al may be used. In the IR range, Au and alkali metals such as K or Li may be used. The prisms 230a and 230b may be made of a high-index glass as previously described.

The index of refraction of the electro-optic material 210 changes in response to a voltage control signal from source 212. This index change further causes a change in the optical thickness of the electro-optic material 210. Therefore, the surface plasmon resonance frequency and the transmission spectrum of the device 200 change accordingly.

Figure 3A:
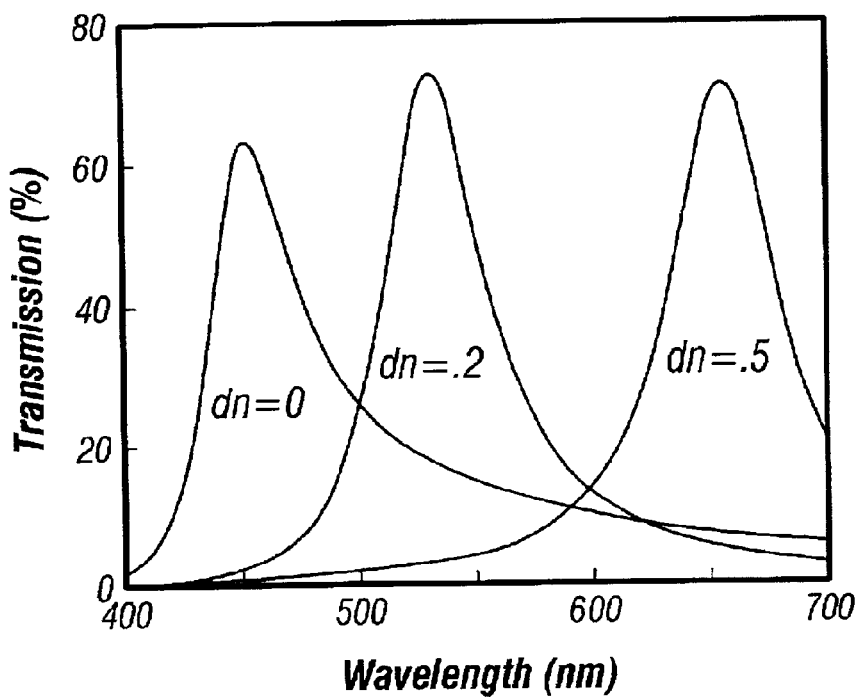
FIG. 3A is a chart of calculated transmission spectrum of the surface plasmon filter of FIG. 2 using silver films under different changes in the index of refraction of the electro-optic layer.

FIG. 3A is a chart showing the calculated transmission spectrum for two silver films separated by a 150-nm electro-optic material layer. The calculation is based on the Maxwell wave equations. The prisms are made of $TiO_2$ and the metallic films 220a and 220b are 35-nm silver films. The incident angle is fixed at 45°. When no voltage is applied, the index change dn is zero, and the peak transmission is about 62% at 450 nm (blue). When the voltage-induced index change of the electro-optic layer is dn=0.2, the transmission peak shifts to 530 nm (green) with a transmission of about 73%. When the index increases by an amount of dn=0.5, the peak transmission shifts to 650 nm (red) with a transmission of about 70%. Thus, all three primary colors (red, green and blue) can be achieved in the transmitted light by changing the index of the electro-optic layer by an amount in a range of from 0 to about 0.5.

The intensity and linewidth of a transmission peak in the filter 200 depend on the optical properties and the thickness of the metallic films 220a and 220b. Metals with small imaginary part of the dielectric constant usually lead to higher peak transmission and narrower bandwidth. A thinner metallic layer can be used to achieve greater peak transmission and broader bandwidth.

Figure 3B:
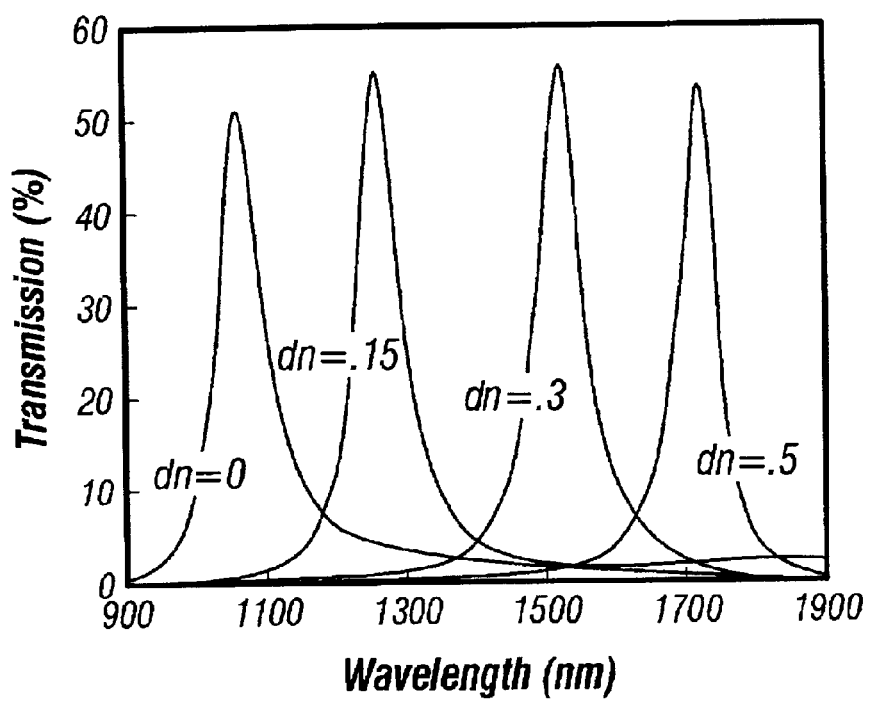
FIG. 3B is a chart of calculated transmission spectrum of the surface plasmon filter of FIG. 2 using potassium films under different changes in the index of refraction of the electro-optic layer.

In addition, different operation spectral ranges may be achieved by using different metals for the metallic films 220a and 220b. For example, potassium films may be used to replace the silver films in the device of FIG. 2 to change the transmission spectrum from the visible range to the infrared (IR) range. FIG. 3B shows that potassium films each of 900 Å are used to achieve a tunable IR spectral range from 1050 nm to 1700 range by varying the index of the electro-optic layer 210 by an amount in a range of from 0 to about 0.5, i.e., index varies from about 1.5 to about 2.0. The coupling prisms are made of $TiO_2$ and the incident angle is about 43°. This particular IR range covers the transmission windows near 1.3 $\mu$m and 1.5 $\mu$m for fiber communication systems.

Figure 4:
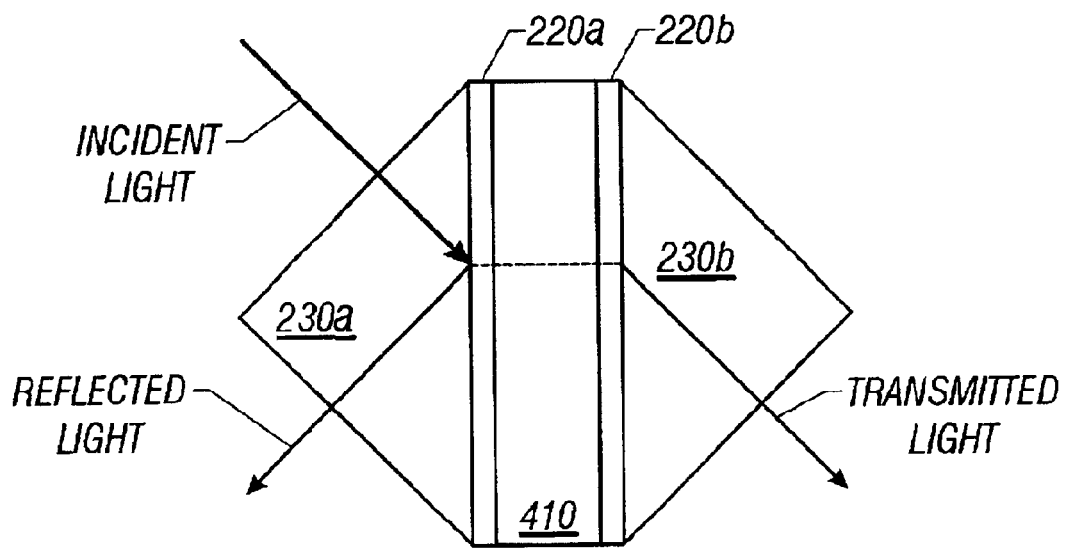
FIG. 4 is diagram showing a surface plasmon filter using an adjustable air gap and high-index prisms.
Figure 5:
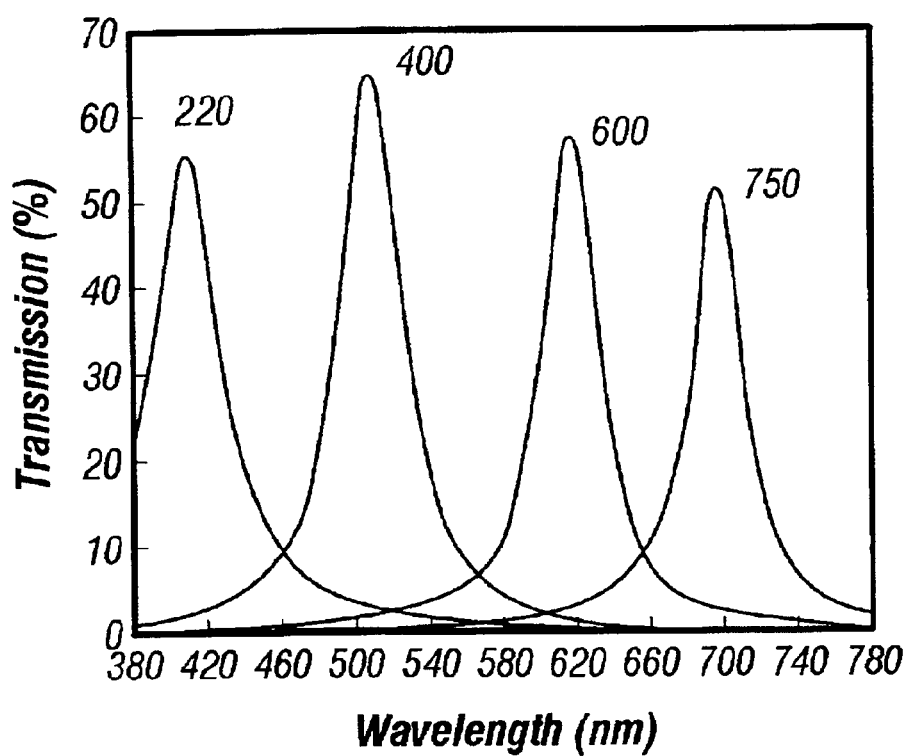
FIG. 5 is a chart of calculated transmission spectrum of the surface plasmon filter of FIG. 4 under different spacings of the air gap.

Another implementation of the embodiment 100 is shown in FIG. 4 which replaces the electro-optic material 210 of FIG. 2 with an adjustable air gap 410 between the two prisms 230a and 230b. In this configuration, the metallic films 220a and 220b are respectively formed on the hypotenuses of the prisms. The metallic-dielectric interfaces along with the surface plasmon waves are excited are metal-air interfaces. The spacing between the metallic films 220a and 220b may be varied by a positioning device such as a piezo-electric transducer. FIG. 5 shows the calculated transmission spectrum of the device of FIG. 4 under different spacings of the air gap 410. The calculation is based on an incident angle of 40°, silver films of 400 Å, and coupling prisms made of the BK7 glass. As the air gap 410 increases from about 200 nm to about 750 nm, the transmission peak shifts from about 400 nm to about 700 nm within the visible spectral range. Transmissions at other spectral ranges may also be achieved, for example, by using different metallic films 220a and 220b.

Figure 6:
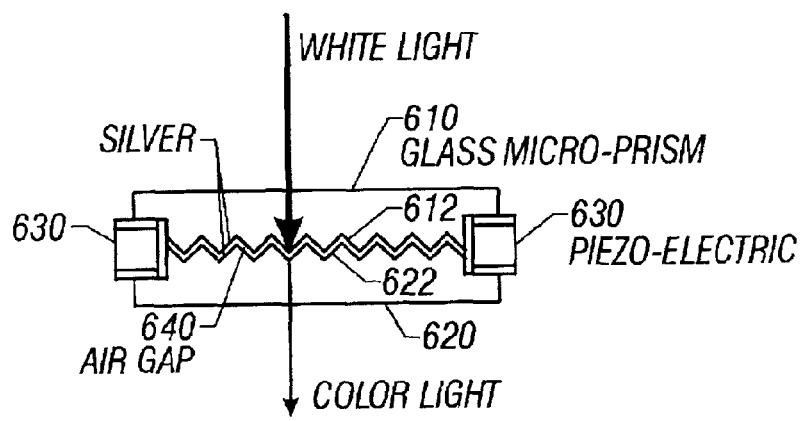
FIG. 6 is diagram showing a surface plasmon filter formed with two glass plates having micro-prisms arrays.

The filter configuration shown in FIG. 4 can be used to form a tunable color filter array by using two micro-prism plates. An example is shown in FIG. 6. Two "T" shaped glass plates 610 and 620 each have a plurality of micro-prisms 612 and 622 arranged in a one-dimensional or two-dimensional prism array on one side of the plates. The micro-prisms 612 and 622 may be formed by etching or other microprocessing techniques. A thin metal film layer is coated on the micro-prisms on each glass plate. The filter 600 is formed by placing the two glass plates 610 and 620 together with the micro-prism sides conforming with each other. Two adjustable spacers 630 (e.g., voltage-controlled piezo-electric spacers) are used to separate the two glass plates 610 and 620 by a thin air gap 640 between the micro-prisms 612 and 622. Preferably, the thin air gap 640 is less than a wavelength. As the length of the spacers 630 is adjusted, the air gap 640 between the micro-prisms 612 and 622 changes. This results in a change in the surface plasmon resonance frequency and consequently a shift in the wavelength of the transmission spectrum.

Figure 7:
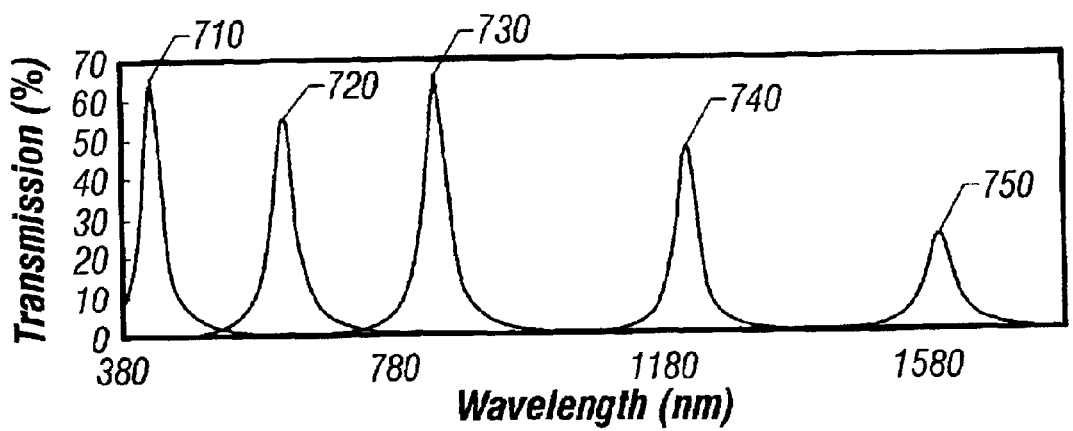
FIG. 7 is a chart of calculated transmission spectrum of the surface plasmon filter of FIG. 6 under different spacings of the air gap between the glass plates.

FIG. 7 shows the calculated transmission of the device of FIG. 6 as a function of wavelength for various spacings of the air gap 640. The calculation is based on silver films of 40 nm thick, an incident angle of 42.5°, and coupling prisms made of the BK 7 glass. When the air gap 640 increases form 300 nm to 5000 nm, the peak reflectivity shifts from 400 nm to 1600 nm. The transmission peaks as labeled are: peak 710 at an air gap of 300 nm, peak 720 at an air gap of 800 nm, peak 730 at an air gap of 1500 nm, peak 740 at an air gap of 3000 nm, and peak 750 at an air gap of 5000 nm.

The air gap surface plasmon tunable filter shown in FIGS. 4 and 6 can be operated under a wide range of temperatures. For example, an operating temperature range from about −200° C. to +200° C. can be achieved by using piezo-electric spacers and choosing the prism glass to match the thermal expansion of the piezo-electric spacers.

Alternatively, the air gap 640 in the micro-prism surface plasmon filter 600 of FIG. 6 may be replaced by a layer of electro-optic material with a fixed thickness. The surface plasmon resonant frequency can be altered by electrically changing the index of refraction.

Figure 8A:
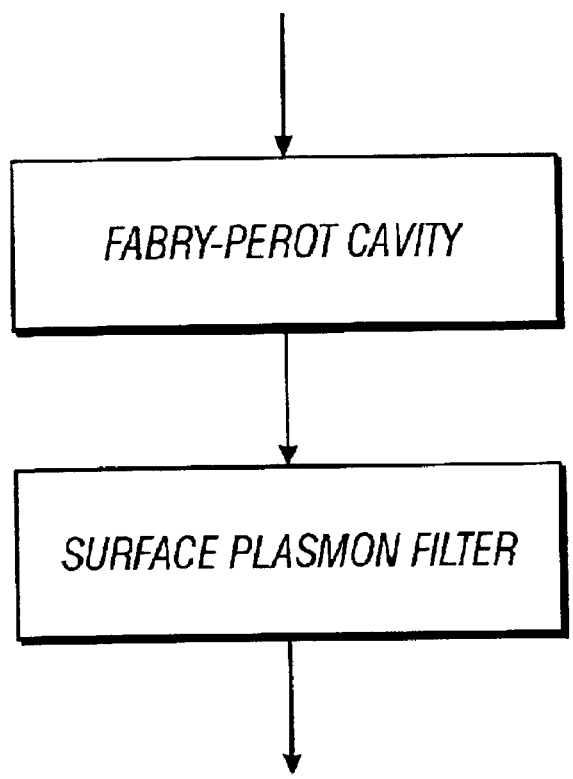
FIG. 8A is a block diagram showing a high-resolution spectrometer based on a Fabry-Perot filter and a surface plasmon filter.

The above-described surface plasmon tunable filters may combine with a Fabry-Perot filter to form a high-resolution spectrometer as shown in FIG. 8A. Fabry-Perot filters can be made to have a high fineness number to achieve high spectral resolution. However, the tuning range of many Fabry-Perot filters is limited. The spectrometer of FIG. 8A has an advantage of the high resolution of the Fabry-Perot filter and the wide tunable range of the surface plasmon filter.

Figure 8B:
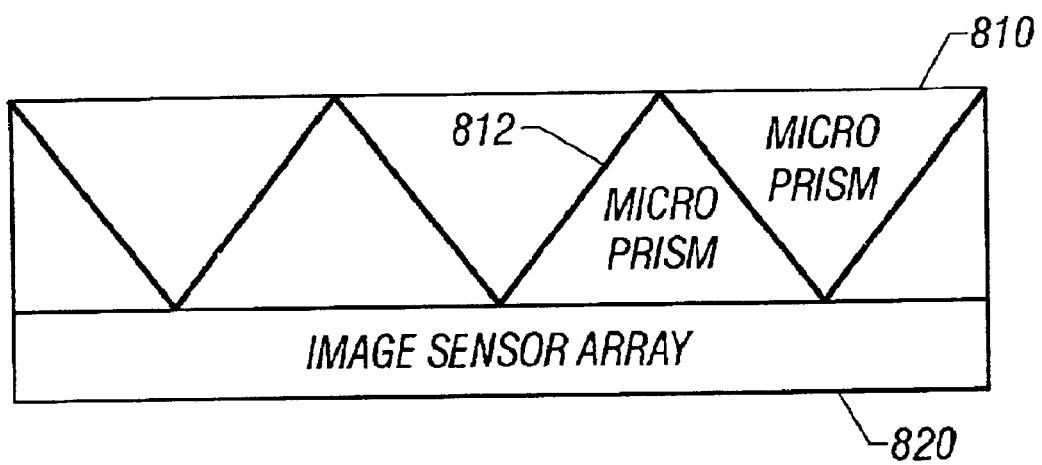
FIG. 8B is a diagram illustrating integration of a surface plasmon filter and a sensor array.

FIG. 8B shows another device based on the surface plasmon filter. This device combines the micro-prism surface plasmon filter 810 with a sensor array 820. The micro-prism surface plasmon filter 810 has an active layer 812 which can be either an air gap or a layer of electro-optic material between two metallic films. The sensor array 820 may be any photodetector array including a CCD array, a diode array, a phototransistor array or an active pixel sensing array ("APS"). In operation, the surface plasmon filter 810 selects the transmission spectrum and the sensor array 820 measures the intensity of the incident pattern, respectively. As shown in FIG. 8A, a Fabry-Perot filter may be added to the device of FIG. 8B to enhance the spectral resolution.

In addition, the device of FIG. 8B may be integrated on a single chip to form an image spectrometer-on-a-chip. In particular, an APS array may be used as the sensor array and the active layer 812 of the surface plasmon filter may be divided into many pixels to match the pixel size of the APS array. The pixel of the active layer 812 can be addressed by an active matrix and the spectrum of each pixel can be individually adjusted.

Figure 9:
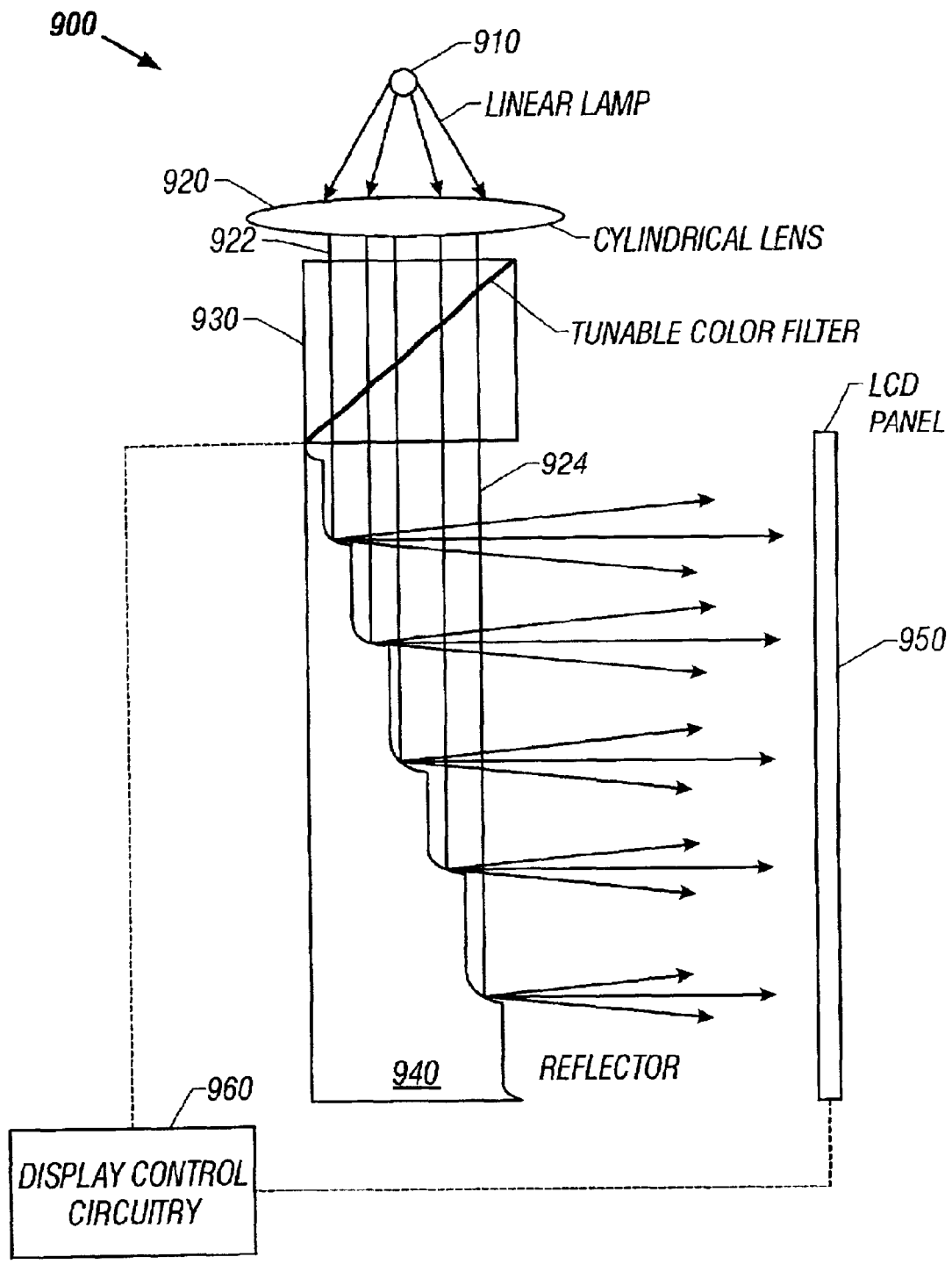
FIG. 9 is a diagram of color LCD display based on a surface plasmon filter.

Furthermore, a surface plasmon filter can be used in either a projection or a direct-view color display system. FIG. 9 shows a back-lit color liquid crystal display ("LCD") system 900 based on a prism-coupled surface plasmon filter 930. A light source 910 and a lens system 920 produce a white beam 922 with a substantially homogenous illumination profile. The light source 910 may be a lamp with a line-shaped filament and the lens system 920 may simply be a cylindrical lens. The surface plasmon filter 930 receives the white beam 922 and produces a beam 924. The color of the beam 924 is electrically controlled by the filter 930 using either an adjustable air gap or an electro-optic material. A reflector 940 further guides the filtered beam 924 to a monochromatic LCD panel 950. Preferably, the reflective surface of the reflector 940 has structures to make the reflected light diffusive in order to improve the homogeneity of the images.

The filter 930 is configured to operate in the visible spectral range from about 400 nm to about 750 nm. For example, the prisms may be made of $TiO_2$ and the metallic films may be made of silver. In addition, an electro-optic material with an index variation range of about 0.5 may be used to achieve all three additive primary colors (i.e., red, green and blue). FIG. 3A shows one possible spectral output of such a filter.

The filter 930 and the LCD panel 950 are controlled by a display control circuit 960. The filter 930 performs color filtering in the homogeneous illumination beam 924 and the LCD panel 950 modulates the intensity distribution of the beam 924 to form images. During each frame scanning in the LCD panel 950 (e.g., 60 frame scans per second), the control circuit 960 controls the filter 930 to change the color of the beam 924 three times by sequentially hopping through three primary colors. This process produces colored images. In many LCD color displays, three pixels are used to produce one image pixel and each pixel has a color filter to produce one of the three primary colors. Thus, the LCD display 900 of FIG. 9 eliminates the color filter in each pixel and can achieve the same resolution in the color images by using only one third of the active pixels in the conventional LCD color displays. In addition, the LCD display 900 can be used to achieve higher image resolution with the same number of active pixels in the LCD panel 950 as in a conventional LCD display.

The above surface plasmon filters having two coupled metal-dielectric interfaces usually produce narrow bandwidth in either reflection or transmission with a Gaussian-like spectral profile. In certain applications, a broad band filter is desirable.

For example, many display systems use a white light source to generate desired primary colors by color filtering. If the bandwidth of the color filters is very narrow, only a small fraction of energy near the desired primary color wavelengths is used and the rest is rejected. Although this may produce highly pure primary colors, the light utilization efficiency is low. For certain display applications that require high display brightness and low power consumption (e.g., portable computers), broad band color filters may be preferred.

A notch filter is an example of such a filter which has a relatively flat center transmission or reflection region and sharp cut-off edges. Four, six or more metal-dielectric interfaces may be coupled to form a multi-layer surface plasmon filter to achieve a "notch" spectral profile in transmission or reflection.

Figure 10:
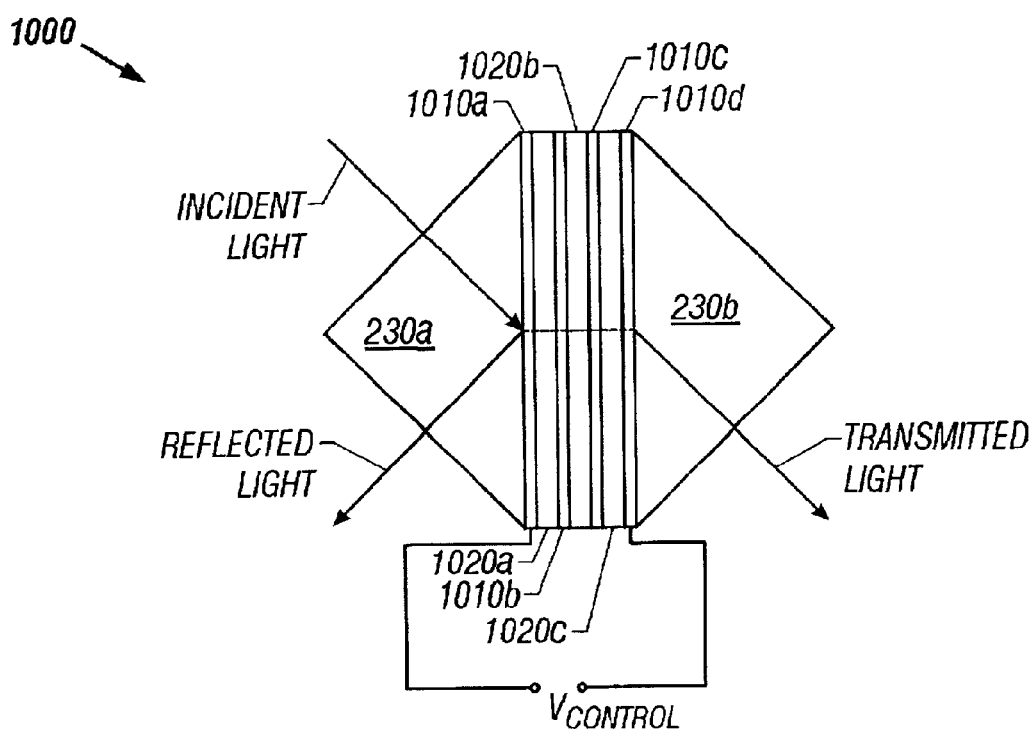
FIG. 10 is a diagram showing one embodiment of a multi-layer surface plasmon filter having six coupled metal-dielectric interfaces.

FIG. 10 shows one embodiment 1000 of a multi-layer surface plasmon filter having six metal-dielectric interfaces. Four metal films 1010a, 1010b, 1010c, 1010d and three dielectric layers 1020a, 1020b, 1020c are alternatively stacked relative to one another to form six symmetric metal-dielectric interfaces. The metal films are sufficiently thin so that the evanescent electromagnetic waves can penetrate therethrough. The dielectric layers are also thin and have an optical thickness on the order of a wavelength.

As an example, the dielectric layers may be formed of an electro-optic material such as a liquid crystal. A voltage may be applied to the two outer metal films 1010a and 1010d to change the optical thickness of each of the three dielectric layers 1020a, 1020b, and 1020c. In this configuration, the device effects three capacitors connected in series. The electric fields in the dielectric layers are essentially the same. The applied voltage changes the index of refraction of each dielectric layer and thereby the optical thickness. This changes the transmission wavelength.

Figure 11:
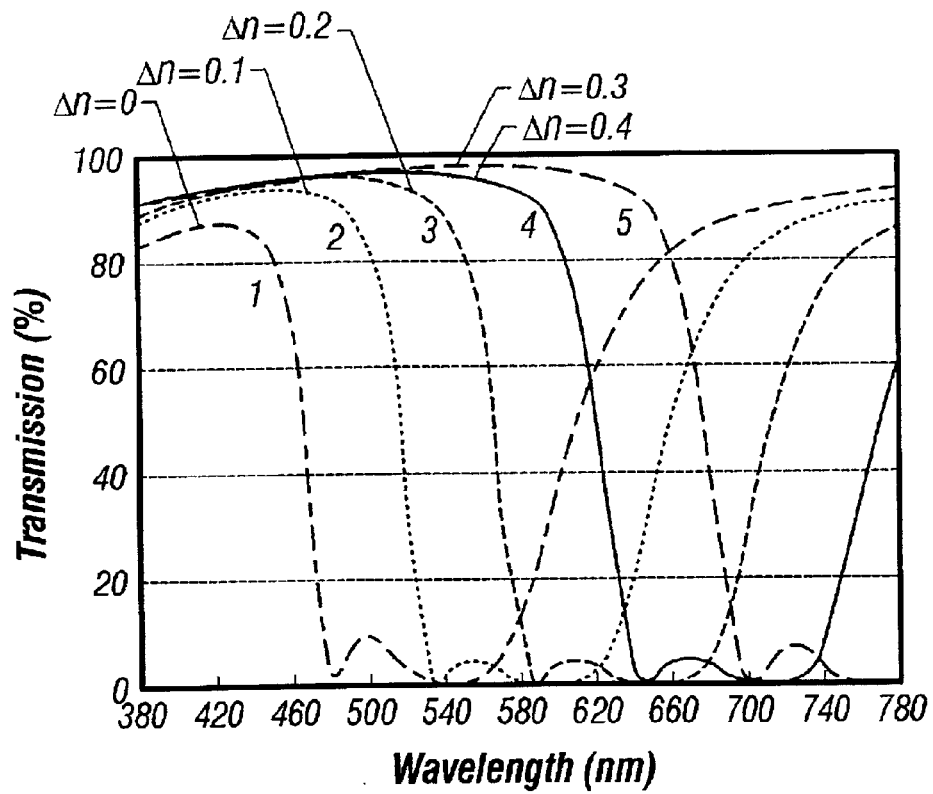
FIG. 11 shows calculated reflection spectrum of the filter of FIG. 10 with three identical liquid crystal layers of 185 nm thick, two outer silver films of 20 nm thick and two middle silver films of 40 nm thick.

FIG. 11 shows calculated reflection spectrum of the filter 1000 having three identical liquid crystal layers of 185 nm thick, silver films 1010a and 1010d of 20 nm thick and silver films 1010b and 1010c of 40 nm thick. Reflection curve 1 represents the reflection spectrum for transmitting in blue-green region when no voltage is applied across the silver films 1010a and 1010d. When a voltage is applied to increase the optical thickness of each dielectric layer, the transmission window shifts toward a longer wavelength. Curves 2, 3, 4, and 5 respectively represent reflection spectra for an voltage-induced increase in the index for 0.1, 0.2, 0.3, and 0.4.

Comparing to the transmission profiles of surface plasmon filters having two coupled metal-dielectric interfaces (e.g., FIGS. 3A and 3B), the spectral profile of the multi-layer filter 1000 has a wider bandwidth and a relatively flat region in the central region of the reflection. Such profile can be achieved by properly configuring the dielectric layers and the metal films. In general, the flatness of the "valley" in the reflection spectrum or "peak" in the transmission spectrum can be improved by increasing the number of layers.

Figure 12:
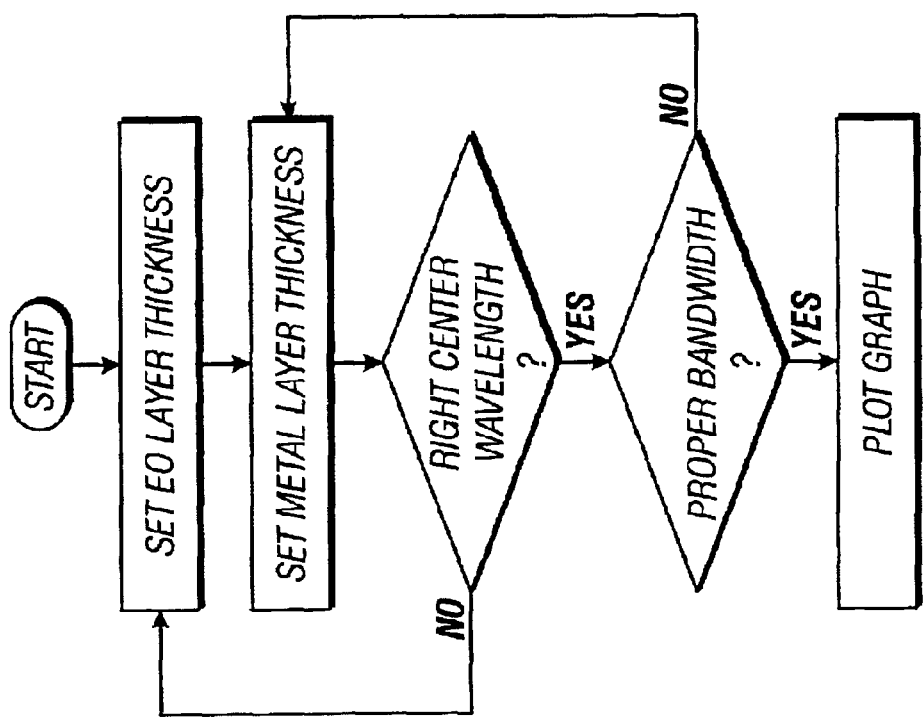
FIG. 12 is a flowchart showing the design process of a multi-layer surface plasmon notch filter FIG. 13A are plots showing exemplary colors that can be generated by different overlapping the reflection spectra of two tunable surface plasmon filters.

FIG. 12 is a flowchart showing the design process of a multi-layer surface plasmon notch filter. If a desired reflection or transmission profile is not achieved by modifying the thickness values of the dielectric layers and the metal layers, the number of layers may be further modified.

Figure 13A:
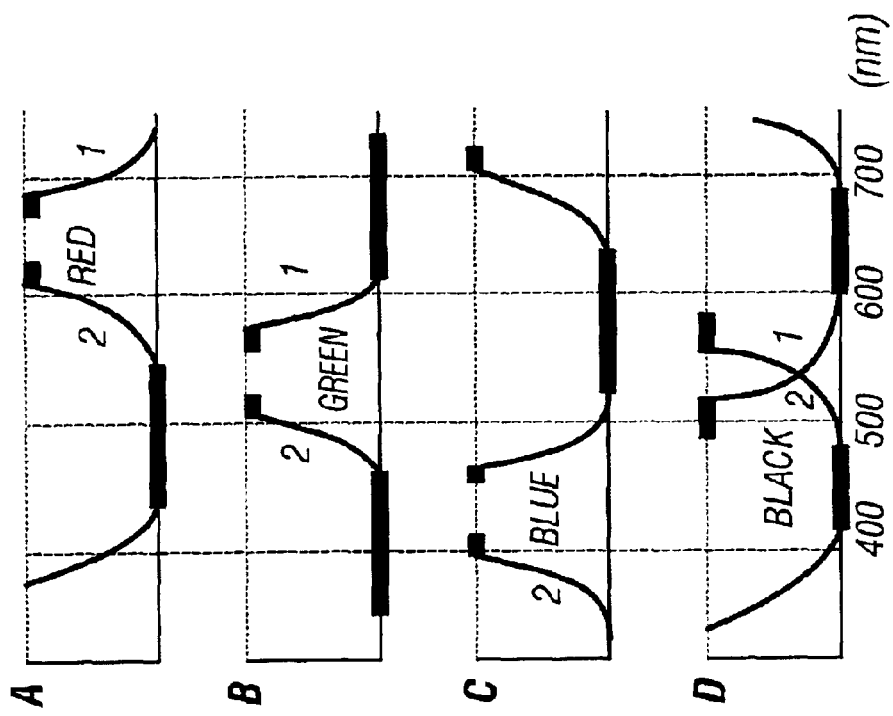
FIG. 13B is a diagram showing one embodiment of a reflective flat panel color display based on the technique shown in FIG. 13A.
FIG. 13C is a diagram showing one implementation of a reflective flat panel color display of FIG. 13B.

The tunable notch filter 1000 in FIG. 10 can be used to form a reflective flat panel display. Consider a color filtering device having two tunable notch filters F1 and F2 used in combination in reflection mode as shown in FIG. 13A. Each notch filter is configured to transmit a bandwidth that covers about two thirds of the visible spectrum. A unpolarized white beam can be polarized by using a polarizer so that the input beam to the first filter F1 is p-polarized. The first filter F1 filters the p-polarized input beam to produce a first reflected beam at a first wavelength determined by the voltage applied thereto. The second filter F2, disposed relative to the first filter to receive the first reflected beam as a p-polarized input, filters the first reflected beam to produce a second reflected beam. The reflections from these two notch filters F1 and F2 can be combined to produce any visible color and grey scale by controlling the applied voltages to shift the reflection spectral regions relative to each other.

Several examples for generating different colors and grey scales by using the above color filter device are illustrated in FIG. 13A. In the first chart in FIG. 13A, the notch filter F1 is tuned to transmit light from 400 nm to 600 nm and reflect red and other wavelengths while the notch filter F2 is tuned to transmit the IR spectrum and to reflect all visible light. This produces red light by reflecting a white beam off the notch filters F1 and F2. Different red grey scales can be generated by shifting the filters F1 and F2 to partially overlap with each other with different degrees in the red region. For example, shifting the filter F2 toward the visible region while maintaining the filter F1 at the spectral position shown would reduce the brightness of the red. When the F2 is at a position to transmit green and red and reflect other colors, the reflection becomes black (no reflected light). If the transmission windows are completed shifted out of the visible region, the reflection is white.

The second and third charts in FIG. 13A show generation of green and blue colors, respectively, in the reflected light by using the two notch filters F1 and F2. The fourth chart in FIG. 13A shows a dark green color by partially overlapping the transmission windows in the green-yellow region (approximately from 500 nm to 600 nm).

Figure 13B:
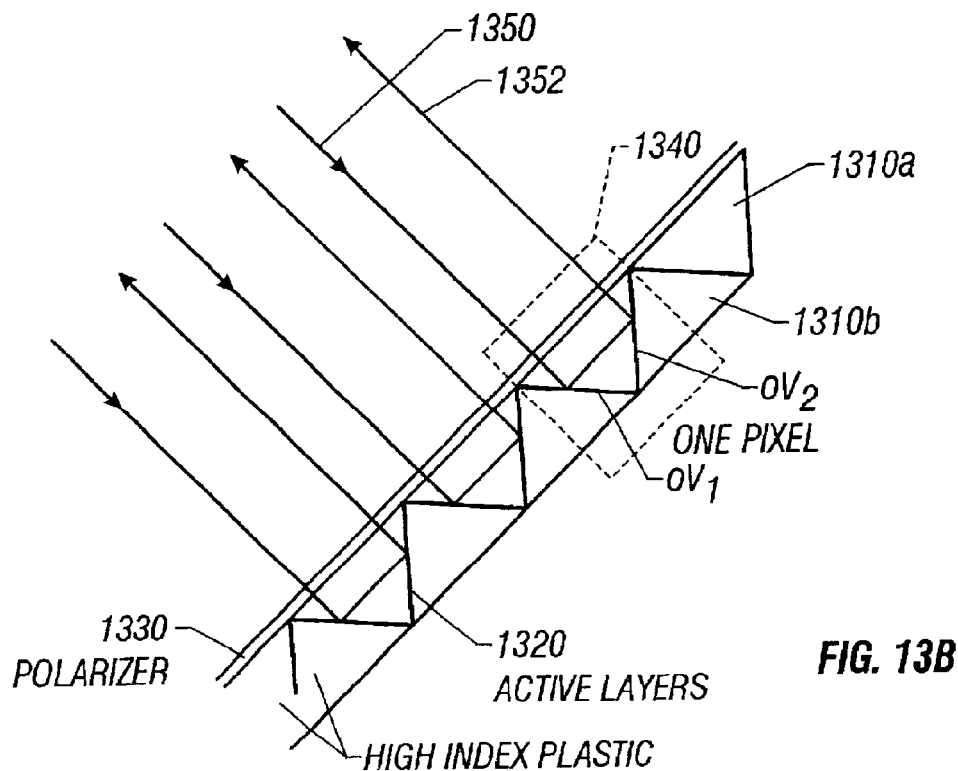

The multi-layer surface plasmon filter 1000 shown in FIG. 10 can be used to form reflective flat panel color display. FIG. 13B depicts one embodiment. A prism array is formed of two layers of micro prisms 1310a and 1310b of a high-index optical material (e.g., plastic) that stack over each other and is used to provide proper optical coupling. The interface sections 1320 between two layers of micro prisms are formed with multi-layers of alternating metal films and electro-optical dielectric layers as shown in FIG. 10. Each interface section is applied with a control voltage so that the reflected wavelength can be independently controlled. A polarizing layer 1330 is formed on top of the prism array to select p-polarized light. The angle of the micro prisms is configured in such a way that a visible light beam incident in the normal direction to the prism array surface satisfies the surface plasmon resonance condition. In a preferred embodiment, the prism angle is near or at 45° as shown.

Two adjacent interface sections define one color pixel 1340. An incident ray 1350 is reflected by the two interface sections to exhibit a desired color and grey scale when their transmission windows are tuned at proper spectral positions.

Figure 13C:
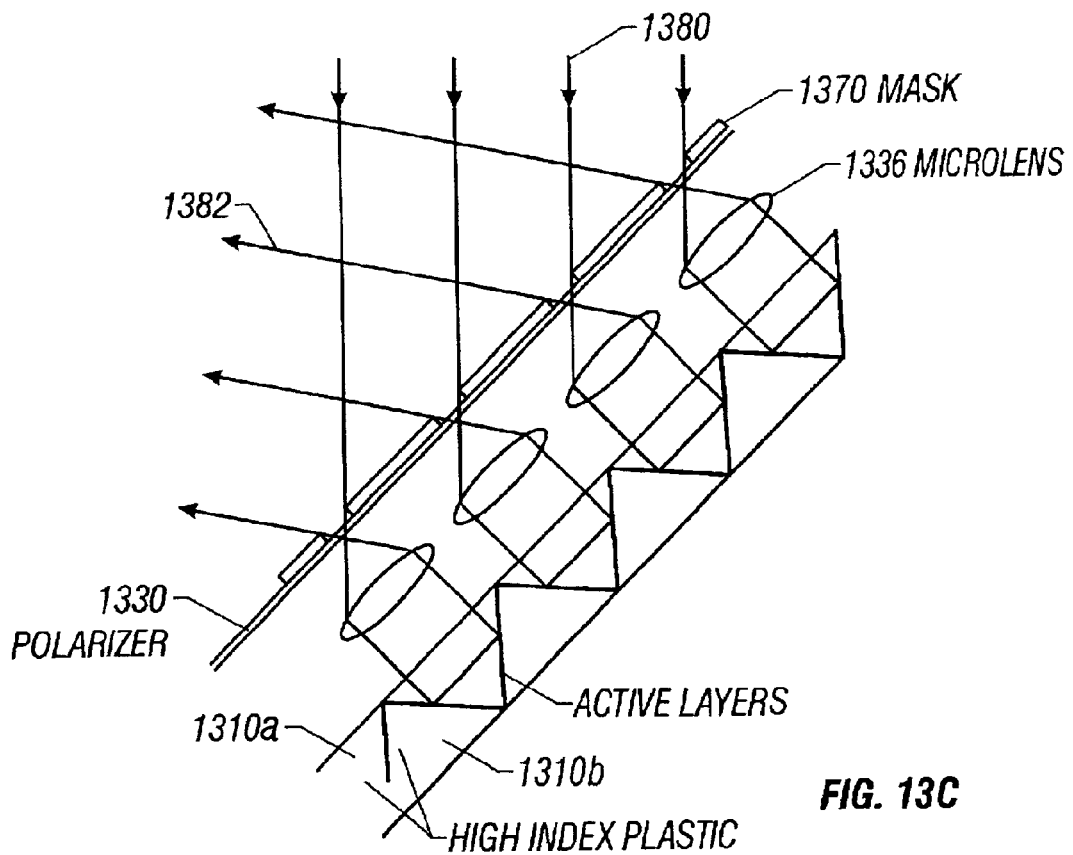

FIG. 13C shows one example of actual color display device based on the embodiment shown in FIG. 13B. A microlens array 1360 is disposed between the polarization layer 1330 and the microprism array to increase the viewing angle. Each microlens in the array 1360 is located to cover one color pixel. An opaque mask 1370 with an array of apertures can be placed at or near the focal plane of the microlens array 1360. The apertures are aligned with the pixels. In operation, light incident on each pixel is collimated by the respective microlens and then reflected twice in that pixel to obtain color and grey scale, and finally is spread to a divergent beam by the same microlens to form a large viewing angle. A slant incident ray 1380, for example, is refracted by a corresponding microlens and is reflected back to another direction as a ray 1382.

The reflective flat panel color displays in FIGS. 13B and 13C can use ambient light for illumination. Reflected light at a wavelength satisfying the resonance condition of the surface plasmon filter can be nearly completely reflected to achieve a high efficiency.

Such reflective color displays provide an alternative to the conventional color LCD displays widely used in notebook computers and other portable devices. A color LCD display such as the active matrix LCD in a notebook computer consumes a large portion of the power supply (e.g., as high as 80%). Use of the surface plasmon reflective display can significantly reduce power consumption and extend the actual operating time of a portable device such as a notebook computer when powered by a battery.

Another application of the surface plasmon filters is to form a tunable color filtering device to produce sequential colors for projectors using white light sources for illumination.

Figure 14A:
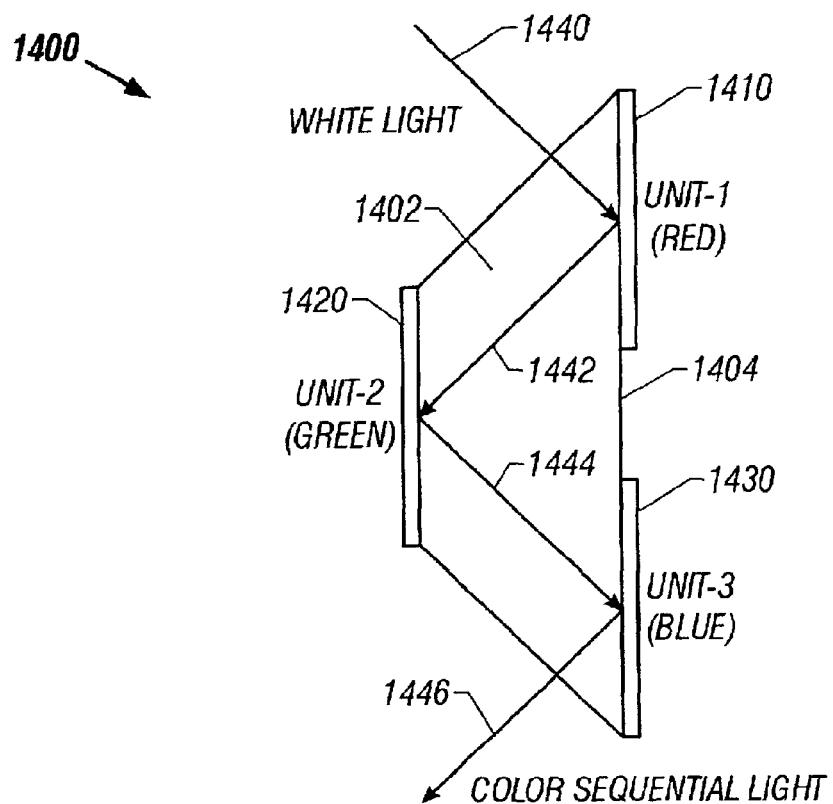
FIG. 14A is a diagram showing one embodiment of a color filtering device for producing sequential colors.

FIG. 14A shows one embodiment 1400 of such a tunable color filtering device. Three surface plasmon filters 1410, 1420, and 1430 are arranged relative to one another to sequentially reflect an incident white beam 1440 from the first filter 1410 to the second filter 1420 and to the third filter 1430. The first and third filters 1410 and 1430 are placed in a plane 1404 and are displaced from each other. The second filter 1420 is placed to face the plane 1404 in a position to reflect light from the first filter 1410 to the third filter 1430. A high-index optical material 1402 is filled between the filters 1410, 1420, and 1430 to provide proper optical coupling similar to the high-index prisms used in above surface plasmon filters. Since p-polarized light is needed to excite surface plasmon waves in each filter, a polarizer can be placed in the input path of filter 1410 to ensure that only p-polarized light enters the device 1400.

For a given filter, if the transmission window is set for a selected color, the reflection of a white incident light is the complementary color of that selected color. Each filter can be configured to satisfy a surface plasmon resonance to transmit a selected primary color when no voltage is applied. In addition, a proper voltage can be applied to the filter to destroy the resonance condition so that the filter becomes completely reflective in the entire visible spectrum. Hence, each filter can be configured to have two states: an "on" state to transmit a selected primary color and reflect other colors when no voltage is applied, and an "off" state when a voltage is applied to reflect all visible colors.

A notch surface plasmon filter as shown in FIG. 10 can be used for this purpose. The multi-layers of alternating metal films and dielectric layers can be configured to have a transmission window at a primary color (e.g., red, green, or blue) with a bandwidth of about one third of the visible spectrum without an external voltage. A voltage can be used to shift the transmission window out of the visible spectrum to generate the "off" state so the filter behaves like a mirror.

Referring to FIG. 14A, the three filters 1410, 1420, and 1430 can be designed to transmit red, green, and blue when no voltage is applied, respectively. Therefore, when a white light beam is sent in and no voltage is applied to any of the filter, the red portion is lost by reflection at the first filter 1410, the green portion is lost by reflection at the second filter 1420, and the blue portion is lost by reflection at the third filter 1430. Hence, no light comes out. This produces a "black" color. To produce a white output, a proper voltage is applied to each of the filters to turn "off" the transmission of each filter so that all filters become reflective, like mirrors. The transmitted colored light in each filter can be absorbed by using a light absorbing material. For example, a semiconductor substrate can be used to function as both a light absorber and a heat dissipator. An additional heat absorber may be used to further extract the heat from the light absorbing material.

An output with a primary color can be produced, therefore, by applying voltages only to two of the filters and applying no voltage to the remaining filter. The output color, therefore, is the primary color of the filter without voltage. A sequence of three primary colors can be generated by sequentially turning on and off voltages on the filters. For example, a red output can be produced by applying voltage to the first filter 1410 to turn off the transmission in the visible range while applying no voltage to the filters 1420 and 1430. When a voltage is applied to the second filter 1420 and no voltage is applied to the filters 1410 and 1430, the output is green. A blue output can be generated by applying voltage only to the third filter 1430.

This allows for a full color display. The switching rate for each filter should be at least three times of the frame rate, e.g., 180 Hz for a 60-Hz frame rate.

Such a color filtering device can be used to replace a color wheel to produce colors with a high efficiency. Since there are no moving parts, such a filter is generally more reliable than a color wheel and simplifies the display structure.

Figure 14B:
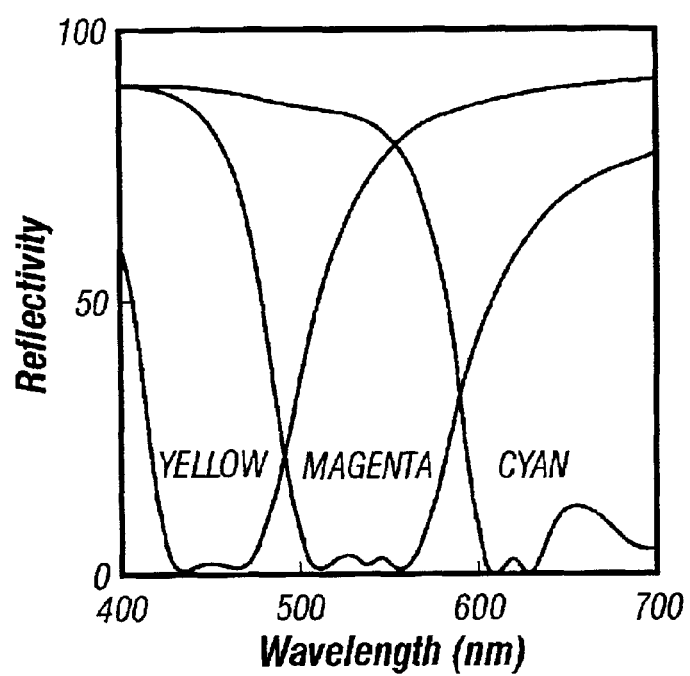
FIG. 14B shows the reflectivity spectra of three filters based on a multi-layer design when illuminated by a white input beam.
Figure 14C:
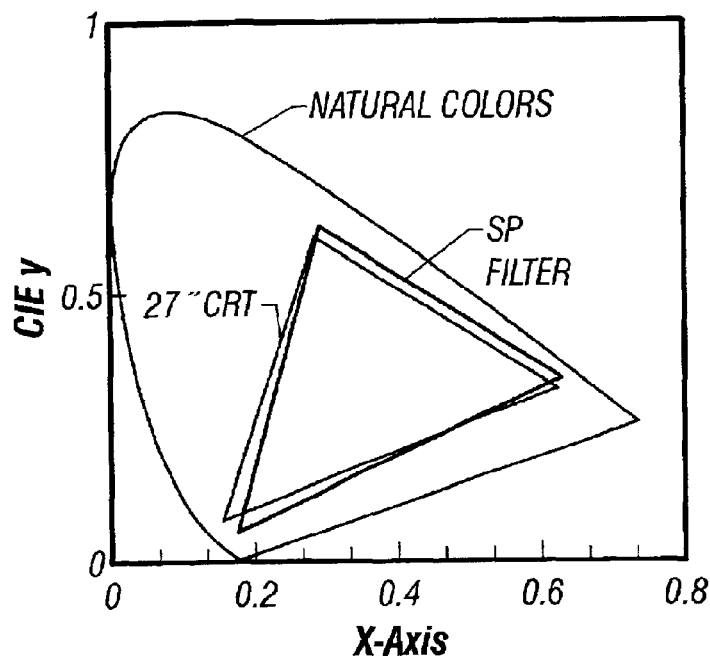
FIG. 14C is a CIE diagram to show the color purity of the primary colors produced by the filters shown in FIG. 14B.

FIG. 14B shows the reflectivity spectra of three filters based on a multi-layer design when illuminated by a white input beam. The complementary colors cyan, magenta, and yellow of the primary additive colors red, green, and blue are respectively produced. The incident white beam has a half cone angle of about 6.7° and a contrast ratio up to and greater than 200:1 can be obtained with a liquid crystal material as the electro-optic material in the multi-layer construction. FIG. 14C is a CIE diagram to show the color purity of the primary colors produced by the filters shown in FIG. 14B. The color triangle formed by heavy lines represents colors that can be produced by the surface plasmon device. The colors that can be produced by a 27" CRT are indicated by a color triangle of light lines for comparison. The natural colors are also shown.

Figure 15:
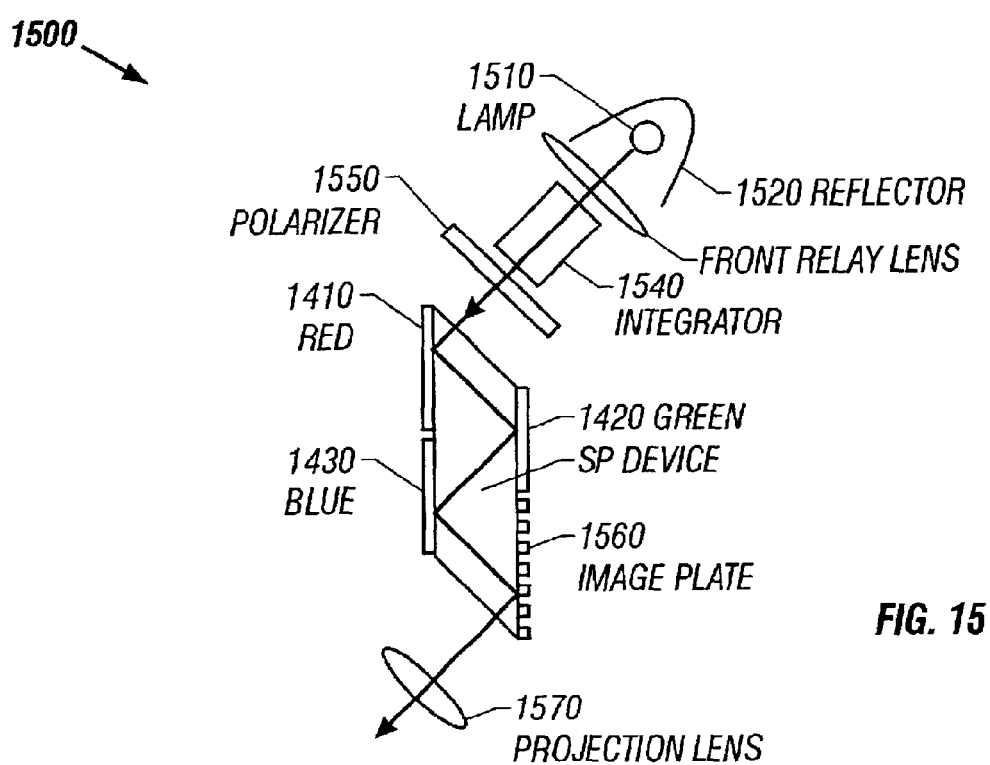
FIG. 15 is a diagram illustrating a color display system based on the filter of FIG. 14A.

A spatial light modulator can be combined with the filtering device 1400 in FIG. 14A to modulate the intensity of the filtered output and to produce color images. FIG. 15 shows one embodiment 1500 of such a full-color display system. A spatial light modulator 1560 such as a LCD panel is implemented. Since the colors are sequentially produced, there is no need to use three adjacent pixels in the light modulator 1560 to produce a color pixel. Each pixel forms a color pixel. This increases the image resolution. A white light source such as a lamp 1510 is used for illumination. A suitable reflector 1520 is used to direct and collimate the light. An optical relay element 1530 (e.g., a lens) couples the light from the reflector 120 to the color filters 1410, 1420, and 1430. An optical integrator 1540 is used to improve the uniformity of the intensity across the beam. A polarizer 1550 ensures the light incident to the filters is p-polarized. A projection lens 1570 is used to project the output color images to a screen for viewing in either front projection mode or back projection mode.

Figure 16A:
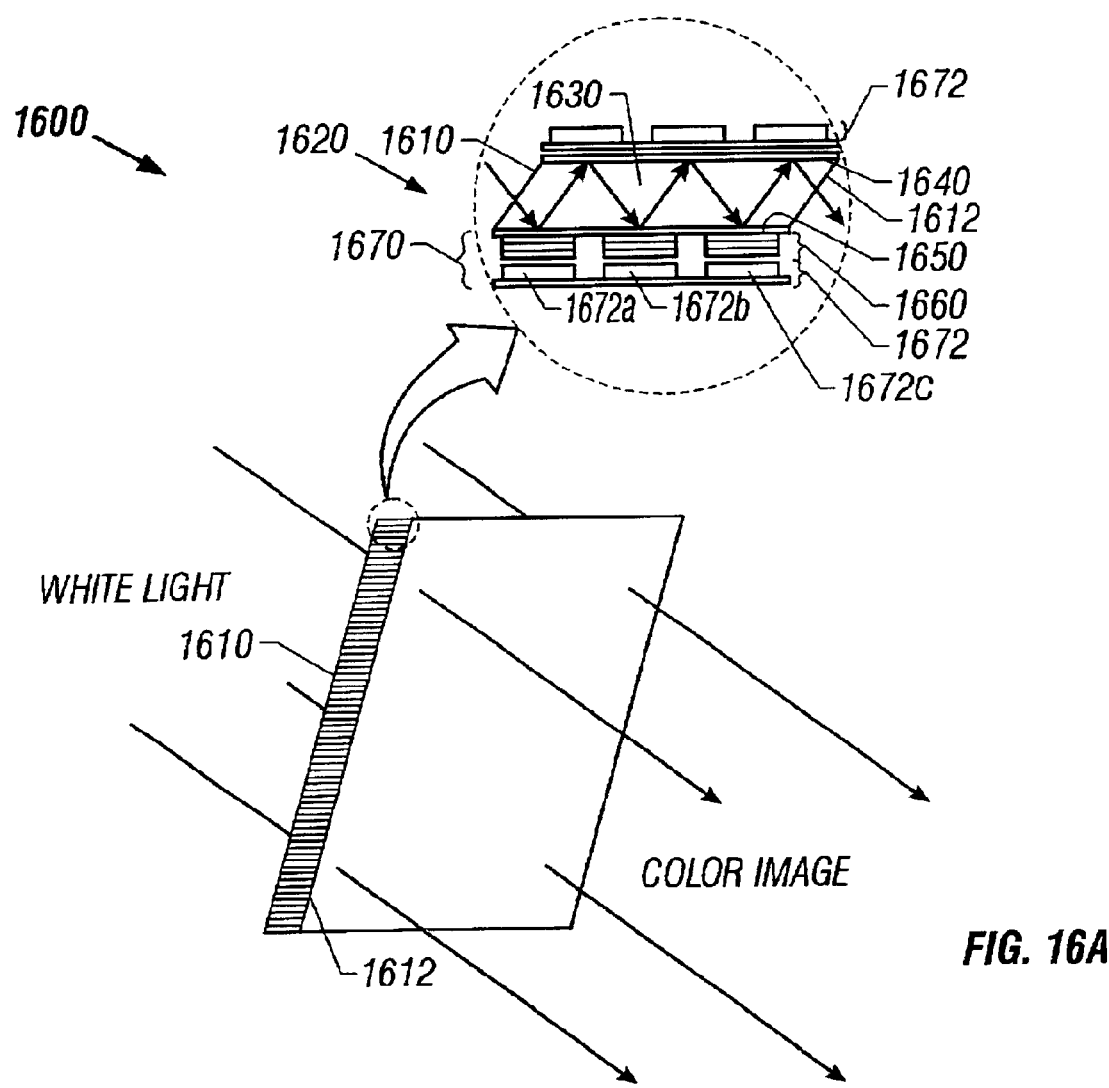
FIG. 16A is a diagram showing an exemplary smart card image device based on surface plasmon filters.

The device shown in FIG. 14A may be modified to form a special flat panel display, a "smart card" image device having an array of active pixels each capable of producing colors and intensity modulation. FIG. 16A shows an exemplary smart card image device 1600 having an input surface 1610 and an output surface 1612. Each pixel 1620 is formed of a high-index dielectric material such as a high-index glass 1630 to form a light-conducting channel to guide light from the input surface 1610 to the output surface 1612.

The light-conducting channel has two parallel surfaces 1640 and 1650. The surface 1640 is coated with either a dielectric material with an index less than that of the dielectric material 1630 to confine light within the channel by total internal reflection or a reflective coating (e.g., metal) to reflect the light back into the channel. The surface 1650 is a metallic layer to form the first metallic side of coupled multi-layer metal-dielectric interfaces 1660 that form a surface plasmon tunable filter 1670 according to the notch filter shown in FIG. 10.

Each metal layer is patterned into three separate sections along the light conducting channel so that two adjacent metal sections in each metal layer are insulated from each other. This structure effects three independent coupled multi-layer surface plasmon filters.

A thin-film transistor layer 1672 with multiple thin-film transistors ("TFTs") is formed on the other side of the multi-layer 1660 to provide control voltages to the filters. Three TFTs 1672a, 1672b, and 1672c are shown to respectively control voltages to the three filters formed in the multi-layer structure 1660. The metal layer 1650 is a common electrode for all three filters and may be set at a fixed potential or grounded. Each control voltage supplied by a respective TFT shifts the transmission window in a way similar to the filtering operations shown in FIG. 11. This changes the spectral composition of the beam reflected off that filter.

In the embodiment 1600, an incident light beam is reflected six times within the light conducting channel, three times by the surface 1640 and three times by the filters 1660, before exiting the output surface 1612. The intensity (i.e., grey scale) and color (i.e., spectral composition) of the output light beam are determined by the spectral positions of the three transmission windows of the filters. Similar to the filtering operations by successive reflections from two multi-layer surface plasmon filters shown in FIG. 13A, the relative spectral positions of the three transmission windows determine the color of the output beam and the amount of the overlap of the transmission windows produces different grey scales. At least two filters are needed in each light conducting channel to provide full color and intensity modulation. In general, increasing the number of filters in each conducting channel can increase the number of grey scales and the colors.

Figure 16B:
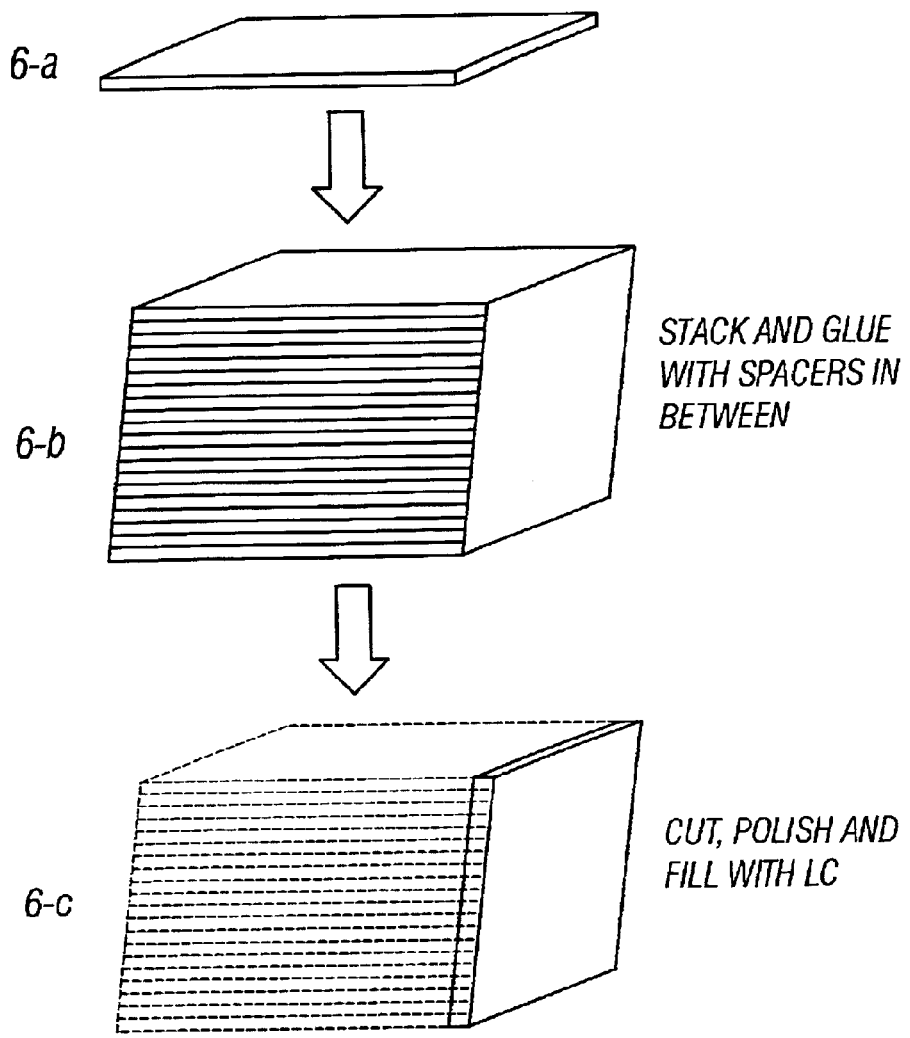
FIG. 16B illustrates the manufacturing process of the smart card imaging device of FIG. 16A.

FIG. 16B illustrates the manufacturing process of the smart card imaging device 1600. First, a thin plate is formed, by known techniques, to include the layers 1640, 1630, 1650, 1660, and 1672 shown in FIG. 16A. Then, a multiplicity of such plates are stacked and attached together by using, e.g., a suitable adhesive. Insulating spacer layers may be used between the plates. The stack is sliced at a desired angle and polished to produce multiple smart cards.

If liquid crystal is used as the electro-optical material, the layer 1660 is formed with thin chambers for filling the liquid crystal. After slicing, the chambers in each card are filled with liquid crystal and sealed.

The above smart card device uses the surface plasmon filters to form color images without color separation and color fusing. Only one projection is needed to image the output beams from the output surface to a screen. This provides an efficient display with a simple structure.

Figure 16C:
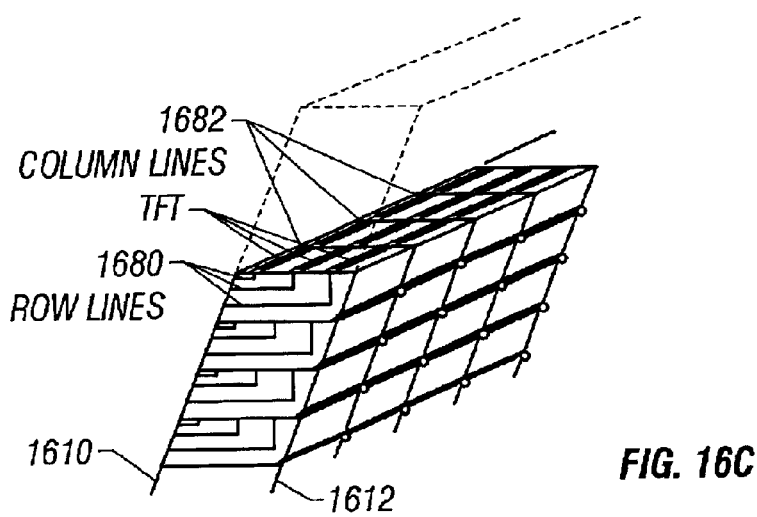
FIG. 16C is a diagram showing one design of addressing the transistors in the device of FIG. 16A.

Such smart card device requires addressing a TFT array in a three dimension space since at least two TFTs are required in the direction perpendicular to the card surface. For a smart card with VGA resolution, at least 480×640×2 TFTs need to be addressed. FIG. 16C shows one design for addressing the TFTs. The connection of the row lines are straight and can be done with known techniques. The column lines are formed by thin metal strips that run through the output surface 1612. Such thin metal strips do not significantly affect the efficiency since the scattered light from the strips is generally in the forward direction.

One application of the such smart card device is the direct-view flat panel display by placing a screen at the output surface. The stack structure of the smart card device eliminate many limitations in the direct-view LCD displays such as the glass flatness and the liquid crystal layer uniformity. Hence, large-size direct-view flat panel displays exceeding 30" can be made using such technology.

Figure 17A:
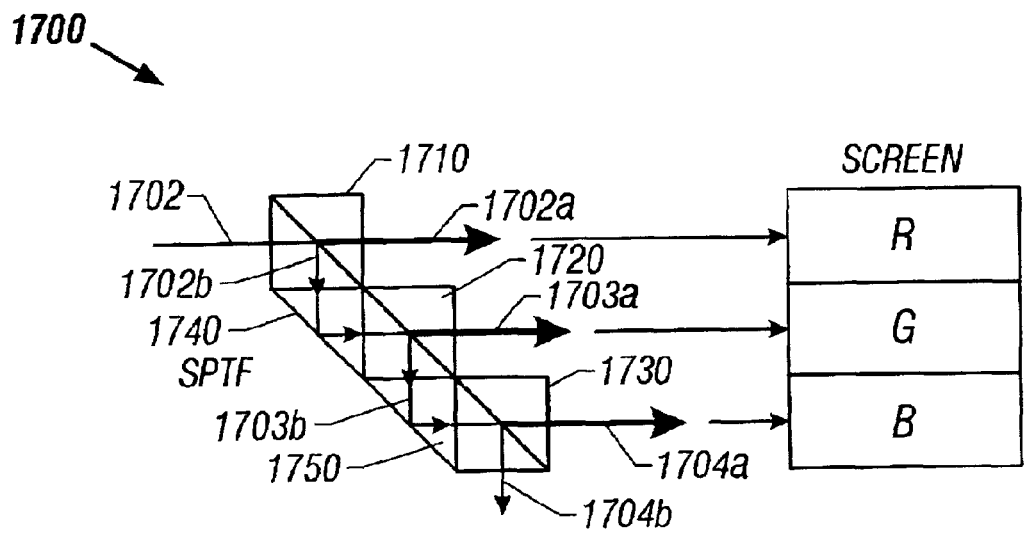
FIGS. 17A, 17B, and 17C show structure and operation of one color filter using three surface plasmon tunable filters.

Sequential light filters, such as color wheels and the device shown in FIG. 14A, transmit one color at a time. Hence, about two thirds of the energy of an input white beam is lost. Such loss of light energy can be avoided by combining three surface plasmon tunable filters to form a color generating device 1700 as shown in FIG. 17A.

Three prism-coupled surface plasmon tunable filters 1710, 1720, and 1730 are displaced from one another to generate three primary output colors from a white input beam 1702. Two reflectors 1740 and 1750 such as prisms are respectively placed between the filters 1710 and 1720 and between the filters 1720 and 1730 to direct the reflected beam from the filter 1710 to the filter 1720 and the reflected beam from the filter 1720 to the reflector 1730. Preferably, each filter is a multi-layer surface plasmon filter as shown in FIG. 10 and has a tunable transmission window with a bandwidth about one third of the visible spectral range.

In operation, the three filters 1710, 1720, and 1730 are applied with different voltages to respectively transmit at three different primary colors. When the white input beam 1702 is p-polarized, the first primary color component is transmitted as a first transmitted beam 1702*a* at the first filter 1710 and the remaining is reflected and directed to the second filter 1720 as a p-polarized beam 1702*b*. The second filter 1720 transmits the second primary component color as beam 1703*a* and reflects the rest to the third filter 1730 as beam 1703*b*. The beam 1703*b* is essentially comprised of the third primary component and is transmitted through the third filter 1730 as beam 1704*a* to produce the third primary color.

Figure 17B:
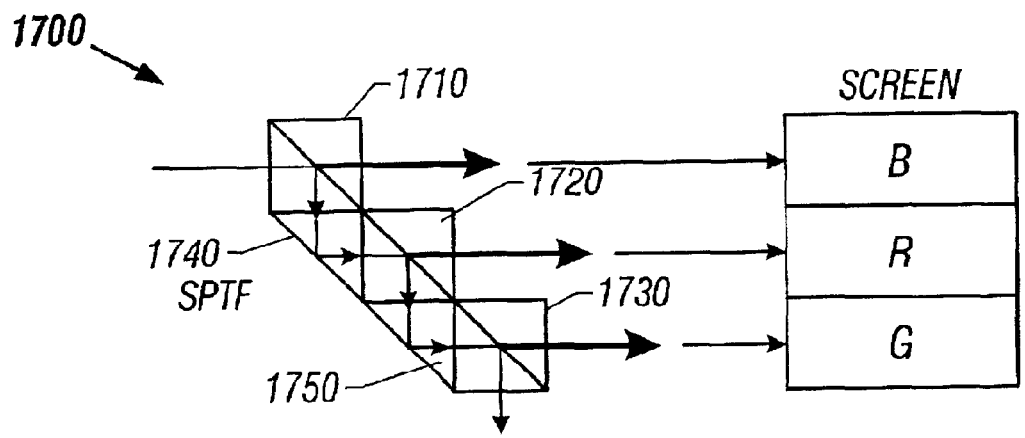
Figure 17C:
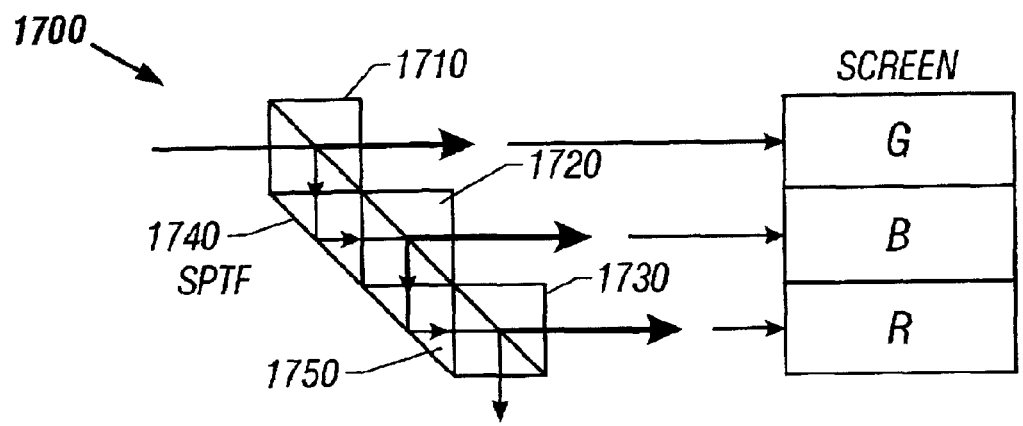

Hence, at any moment, the device 1700 produces three different primary colors. Each image frame has three fields with different colors. To produce color images, the voltage on each filter is scrolled to sequentially produce three different primary colors at a rate three times of the frame rate. Thus, in a single frame, each of the three primary colors is scrolled through all three filters once. FIGS. 17A, 17B, and 17C show one cycle of such color scrolling in a frame.

Similar to the color display system shown in FIG. 15, a spatial light modulator such as a LCD panel only needs one pixel to produce all three colors. This eliminates the need for expensive miniaturized color filters and the requirement of using three pixels to form one color pixel as in many conventional LCD displays. Hence, using the device in FIG. 17 can improve image resolution, simplify device structure, and reduce manufacturing cost. Since all colors are used, the efficiency of such device is increased by a factor of 3 over many conventional LCD color displays.

Figure 18:
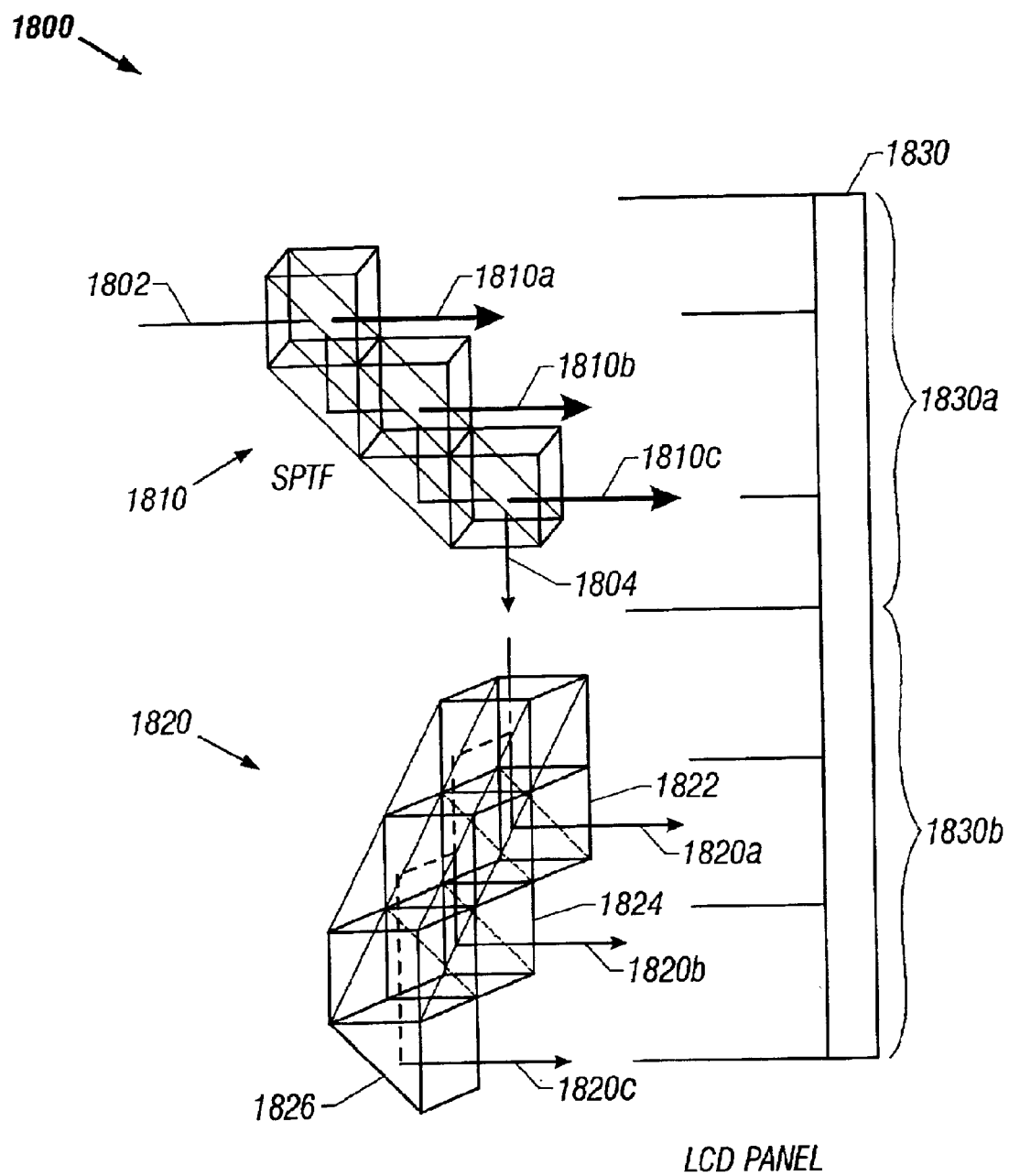
FIG. 18 shows an another color filter based on the device of FIGS. 17A through 17C.

All visible light in the p-polarized input is utilized in the device 1700. However, if the input white beam 1702 is unpolarized like in many lamp sources, only the p-polarized portion in the visible range is used for image display and the other half of s-polarized light is rejected as an output beam 1704*b*. FIG. 18 illustrates a surface plasmon device 1800 capable of using all visible energy of a unpolarized white input beam.

The device 1800 combines two devices 1810 and 1820 as shown in FIG. 17A to achieve the above purpose. The device 1820 is rotated with respect to the device 1810 in such a way that the rejected s-polarized light by the device 1810 enters the device 1820 as p-polarized light. The device 1810 is used to produce one half (e.g., 1830*a*) of a display 1830 and the device 1820 is used to produce the other half (e.g., 1830*b*). Alternatively, the output beams of the two devices 1810 and 1820 may be overlapped to produce a display.

In the embodiment shown in FIG. 18, the device 1820 is formed by a device identical to the device 1810 but is rotated 90° so that a s-polarized light with respect to the device 1810 becomes p-polarized in device 1820. In addition, three reflectors (e.g., prisms) 1822, 1824, and 1826 are added to respectively direct the transmitted light in each filter in the device 1820 in a direction perpendicular to the respective incidence plane so that the output beams 1820*a*, 1820*b*, 1820*c* from the device 1820 are parallel to the output beams 1810*a*, 1810*b*, 1810*c* from the device 1810. Since not only all three colors are used but also both polarizations are used, the device 1800 can achieve an efficiency by a factor of 6 over many conventional LCD color displays.

Although the present invention has been described in detail with reference to the preferred embodiments, various modifications and enhancements may be made. For example, the coupling prisms, e.g., prisms 230*a* and 230*b*, may be made with angles other than an apex angle of 90° as illustrated; a polarizing element may be disposed in the path of the incident beam to change the input polarization to the p-polarization; the surface plasmon filter 930 in the LCD display may be grating coupled or have a micro-prism configuration; the LCD panel 950 may a digital mirror array. In addition, the air gaps may be a gap with a gas other than the air.

For another example, although all the embodiments disclosed change either the thickness or the index of refraction of the center dielectric layer to tune the transmission wavelength, the incident angle of the input light may also be adjusted to change the surface plasmon resonance condition, thereby changing the transmission wavelength. The incident angle may be changed with an angle adjustment device by either adjusting the direction of the input beam or adjusting the orientation of the surface plasmon filter relative to the input beam. In implementation of such angular tuning scheme, the index of the spacing between the two metal-dielectric interfaces may be fixed so that the incident angle is the only tuning parameter. Alternatively, the incident angle and either or both of the index of refraction and the spacing between the two metal-dielectric interfaces may be adjusted to tune the transmission wavelength.

In various color filtering and display applications, coupled multilayer surface plasmon filters such as the one in FIG. 10 are used to take the advantages of the square-like notch transmission window and the configurable transmission bandwidth obtained from proper configurations of the multiple metal-dielectric layers. However, the non-coupled absorbing surface plasmon filters having a single metal-dielectric layer as disclosed in the incorporated U.S. Pat. Nos. 5,570,139 and 5,451,980 can also be used. Although configuring the metal layer by combining different metal films can only offer limited flexibility in changing the absorption spectral profile, the simplicity in the structure of such filters provides easy construction of many of the above devices.

Figure 19A:
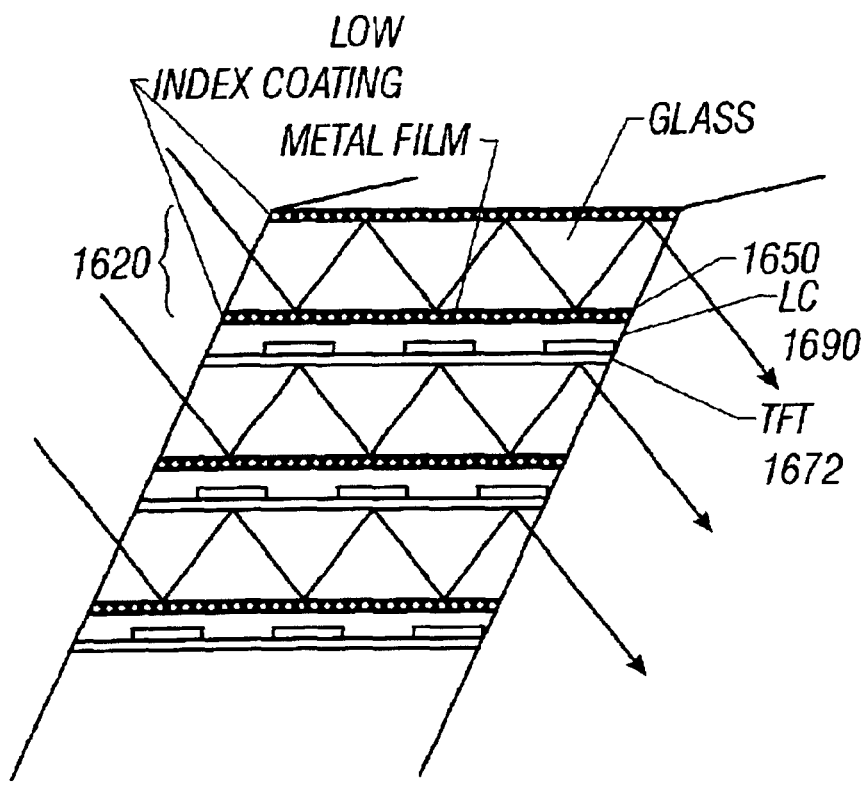
FIG. 19A shows an alternative construction of the pixel in the device of FIG. 16A, where only three layers are used to form a surface plasmon filter: a metal layer, a liquid crystal layer and a thin-film transistor layer.
Figure 19B:
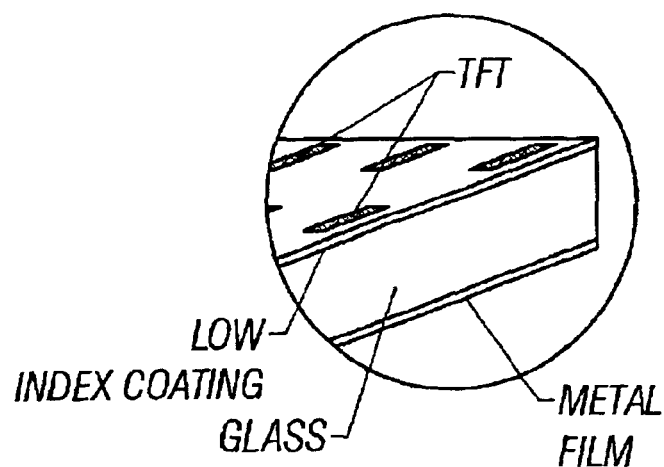
FIG. 19B shows that each plate can be a simple high-index glass plate with one side formed with thin-film transistors and the other side coated with a metal layer.

For example, if the surface plasmon filters in the devices of FIGS. 13 are implemented by non-coupled surface plasmon filters, there is no need to eliminate the unwanted transmitted light since. In forming the device 1600, each pixel 1620 can be significantly simplified by using such non-coupled surface plasmon filters. FIG. 19A shows such an alternative construction of the pixel 1620. Only three layers are needed to form each filter: a metal layer 1650, a liquid crystal layer 1690 and the TFT layer 1672. This simplifies the manufacturing of each plate for forming the stack. FIG. 19B shows that each plate can be a simple high-index glass plate with one side formed with TFTs and the other side coated with a metal layer. Such plates are spaced by spacers when forming the stack so that the liquid crystal can be filled in the space provided by the spacers after slicing.

These and other variations and modifications are intended to be encompassed by the appended claims.

What is claimed is:

1. A device, comprising:

a plurality of layers stacked over one another to form a layered structure which supports a two-dimensional array of light-filtering channels, wherein each layer is structured to have an one-dimensional array of light-filtering channels, wherein the two-dimensional array of light-filtering channels comprises an input surface from which said light-filtering channels receive input light and an output surface from which said light-filtering channels export output light, and wherein each light-filtering channel comprises:

a light-conducting channel formed of a transparent dielectric material having a first surface which is substantially reflective and a second surface opposing said first surface, said first and second surfaces substantially parallel to said light-conducting channel; and at least two optical filters sequentially formed on said second surface along said light-conducting channel to reflected said input light between said first and second surfaces so that said input light is sequentially reflected and filtered by said optical filters to produce said output light, wherein each optical filter includes at least one metal layer and an electro-optical dielectric layer contacting with each other to form a metal-dielectric interface which generates a surface plasmon wave in response to a p-polarized input light beam to transmit light at a selected wavelength within a bandwidth according to a control voltage from said metal layer to said dielectric layer and reflects light of other wavelengths; and at least two thin-film transistors respectively formed on said optical filters to provide said control voltage to control a refractive index of said dielectric layer and thereby said selected wavelength to change a color and a gray scale of said output light.

2. The device as in claim 1, wherein said dielectric layer includes a liquid crystal material.

3. The device as in claim 1, further comprising a screen positioned relative to said output surface to receive said output light from said light-filtering channels to form an image.

4. The device as in claim 1, wherein said input surface is substantially parallel to said output surface, and wherein said input and output surfaces each form an angle with respect to said first and second surfaces in each light-filtering channel.

5. The device as in claim 1, further comprising a polarization element that receives and transmits input light to said input surface.

6. A device, comprising:

a plurality of transparent plates each having a filtering surface and an opposing, reflecting surface, a metallic layer formed over said filtering surface of each transparent plate;

an electro-optical dielectric layer, whose refractive index changes in response to a control voltage, disposed in contact with said metallic layer to form a metal-dielectric interface which generates a surface plasmon wave in response to a polarized input light beam to transmit light through said metallic layer at a selected wavelength within a bandwidth according to a local refractive index of said electro-optical dielectric layer at each location of said metallic layer where light is reflected and to reflect light of other wavelengths back to each transparent plate; and a plurality of parallel linear arrays of transistors formed over said dielectric layer, wherein said transistors are independent from one another, and where each parallel linear array of transistors defines a light channel along which light is reflected between said filtering and said reflecting surfaces via at least two locations on the filtering surface with two transistors sequentially located along the light channel to modify a color and an intensity of said light according to voltages from said transistors in each linear array relative to a common voltage of said metallic layer, wherein said transparent plates are stacked over one another so that a reflecting surface of one transparent plate faces a filtering surface of an adjacent transparent plate to form a two-dimensional array o light channels.

7. The device as in claim 6, further comprising a first intermediate metallic layer in contact with said electro-optical material layer and a first electro-optical material layer switched between said first intermediate metallic layer and said plurality of parallel linear arrays of transistors.

8. The device as in claim 6, wherein said transistors are thin-film transistors.

9. The device as in claim 6, wherein each transparent plate is formed of a glass material.

10. The device as in claim 6, wherein said electro-optical dielectric layer includes a liquid crystal material.

11. A method, comprising:

providing a plurality of plates each comprising a dielectric material layer having a first reflective surface and a second, opposing metallic surface;

patterning the second metallic surface to include a two-dimensional array of separate metallic areas, a plurality of metal-dielectric interfaces on each separate metallic area, and thin-film transistors above the metal-dielectric interfaces respectively on the separate metallic areas;

stacking and bonding the plates over one another to form a composite structure; and slicing the composite structure into a plurality of panels of two-dimensional light-filtering channels where each panel includes a portion of the stacked plates and each portion in each plate includes at least three separate metallic areas as three independent surface filters along a direction that is perpendicular to a direction of the slicing and defines a light-filtering channel wherein light incident to one of the light-filtering channels of the plate is sequentially reflected and filtered by the three surface plasmon filters to produce a filtered optical output on the side of the plate.

12. The method as in claim 11, further comprising:

providing independent electric controls to separate metallic areas in one sliced panel; and controlling voltages applied to the independent electrical controls to control light intensities and colors of output light from the light-filtering channels for light entering from one side of the panel and exiting on an opposite side of the panel.

* * * * *